(12) United States Patent
Wixson et al.

(10) Patent No.: US 7,540,011 B2
(45) Date of Patent: May 26, 2009

(54) CACHING GRAPHICAL INTERFACE FOR DISPLAYING VIDEO AND ANCILLARY DATA FROM A SAVED VIDEO

(75) Inventors: Lambert Wixson, Rocky Hill, NJ (US); Mark Wayman, San Francisco, CA (US); Alex Gulyansky, Brookline, MA (US); Jeff Roberts, Fremont, CA (US); Adam Aronson, Greenwich, CT (US); Kassim Chaudry, Metuchen, NJ (US); Kate Rafferty, Hoboken, NJ (US); Julie Shimshack, New York, NY (US)

(73) Assignee: ArrowSight, Inc., New York, NY (US)

( * ) Notice: Subject to any disclaimer, the term of this patent is extended or adjusted under 35 U.S.C. 154(b) by 1355 days.

(21) Appl. No.: 10/125,586

(22) Filed: Apr. 19, 2002

(65) Prior Publication Data

US 2003/0007663 A1    Jan. 9, 2003

Related U.S. Application Data

(60) Provisional application No. 60/296,762, filed on Jun. 11, 2001.

(51) Int. Cl.
*H04N 7/14* (2006.01)
*H04N 5/775* (2006.01)
*H04N 5/783* (2006.01)
*H04N 1/42* (2006.01)

(52) U.S. Cl. .................. 725/52; 725/113; 382/254; 382/276; 348/590; 348/598

(58) Field of Classification Search ............ 348/143, 348/590, 597, 627; 715/723; 725/90, 52, 725/131; 382/254, 267
See application file for complete search history.

(56) References Cited

U.S. PATENT DOCUMENTS

| | | | | |
|---|---|---|---|---|
| 5,530,754 A | * | 6/1996 | Garfinkle | 725/8 |
| 5,568,181 A | * | 10/1996 | Greenwood et al. | 725/92 |
| 5,619,247 A | * | 4/1997 | Russo | 725/104 |
| 5,717,816 A | | 2/1998 | Boyce et al. | |
| 5,729,471 A | * | 3/1998 | Jain et al. | 725/131 |
| 5,742,347 A | | 4/1998 | Kandlur et al. | |
| 5,818,441 A | | 10/1998 | Throckmorton et al. | |
| 5,850,352 A | * | 12/1998 | Moezzi et al. | 345/419 |
| 6,025,837 A | | 2/2000 | Matthews, III et al. | |
| 6,029,194 A | * | 2/2000 | Tilt | 725/94 |
| 6,065,050 A | | 5/2000 | DeMoney | |
| 6,172,672 B1 | | 1/2001 | Ramasubramanian et al. | |
| 6,230,324 B1 | | 5/2001 | Tomita et al. | |
| 6,321,024 B1 | * | 11/2001 | Fujita et al. | 386/55 |
| 6,542,075 B2 | | 4/2003 | Barker et al. | |

(Continued)

*Primary Examiner*—Christopher Kelley
*Assistant Examiner*—Reuben M Brown
(74) *Attorney, Agent, or Firm*—Arent Fox LLP

(57) ABSTRACT

A system and a method for attaining a selectable image sequence are provided. The system includes a viewer display component configured to transmit a request from a user's interface component for the selectable image sequence. The request obtains a handle which corresponds to the selectable image sequence, a display description in which the handle is embedded and a reply response containing the handle that corresponds to the selectable image. The viewer display component is also configured to receive the reply response and to render the selectable image sequence on a display screen of the user's interface component.

4 Claims, 22 Drawing Sheets

U.S. PATENT DOCUMENTS 6,583,813 B1 * 6/2003 Enright et al. .............. 348/150
6,670,966 B1 * 12/2003 Kusanagi .................... 715/723
6,698,021 B1 2/2004 Amini et al.
2001/0003214 A1 6/2001 Shastri et al.
2001/0027561 A1 * 10/2001 White et al. .................. 725/1

\* cited by examiner

| Business Rule Category | Invention Benefit |
| --- | --- |
| Customer Throughput | Increase in revenue due to faster processing of waiting customers |
| Employee Productivity | Increase in revenue due to improvement in employee productivity |
| False Alarm Fees | Reduction in false alarm fees |
| Insurance Premiums | Reduction in insurance premiums |
| Liability Claims | Reduction in liability claims expenses |
| OSHA Compliance Fines | Reduction in expense of OSHA non-compliance fines |
| Product Freshness | Reduction in expense of food discarded due to no longer being fresh |
| Product Placement | Increase in revenue though improved product placement |
| Sales Conversion Rates | Increase in revenue through higher rate of sales conversions |
| Security Guards | Reduction in expenses for security guards (salaries, benefits, training, etc.) through reduction of the number of guards required |
| Shrinkage: Cash and Non-Cash | Reduction in shrinkage expense |
| Site Cleanliness | Reduction in fines paid by local inspection authorities for unclean environments |
| Travel Costs | Reduction in travel expenses |
| Workers' Compensation Claims | Reduction in workers' compensation claim expenses |

CACHING GRAPHICAL INTERFACE FOR DISPLAYING VIDEO AND ANCILLARY DATA FROM A SAVED VIDEO

REFERENCE TO RELATED APPLICATIONS

This application claims priority of U.S. Provisional Patent Application Serial No. 60/296,762 filed on Jun. 11, 2001. The contents of this provisional application are hereby incorporated by reference.

BACKGROUND OF THE INVENTION

1. Field of the Invention

The invention relates to a method and apparatus for an interface that provides a communication and caching protocol design by which snapshot data is retrieved from a digital video server.

2. Description of the Related Art

Many devices capture and digitally store video sequences and ancillary data such as time codes or point-of-sale information. These types of video and ancillary data may be referred to collectively as "video data" or "video sequences". Unfortunately, these video sequences may consume large amounts of digital storage space. Therefore, it is often required that these video sequences be stored digitally on a device that is physically nearby the digital video input device, such as a camera, so that it is not necessary to transmit the data via network links which may operate at a slow transmission rate. However, a user may not always be able to be in close proximity to the video input device when the user wishes to view the video sequence. Namely, the user may wish to view portions of the saved video data from a remote location over a network communication system. A need therefore exists for enabling a user to rapidly locate the portions of data the user wishes and to view the video data captured by the video input device, while minimizing the amount of information that needs to be transmitted.

SUMMARY OF THE INVENTION

One embodiment of the invention is directed to a method of attaining a selectable image, which includes the step of transmitting a request from a user's computer for the selectable image. The request transmitted from the user's computer obtains a handle which corresponds to the selectable image, a display description in which the handle is embedded and a reply response containing the handle that corresponds to the selectable image. The method also includes the steps of receiving the reply response and rendering the selectable image on a display screen of the user's computer in response to the reply response.

Another embodiment of the invention is directed to a system for attaining a selectable image. The system includes a viewer display device configured to transmit a request from a user's computer for the selectable image, wherein the request obtains a handle which corresponds to the selectable image, a display description in which the handle is embedded and a reply response containing the handle that corresponds to the selectable image. The viewer display device is also configured to receive the reply response and to render the selectable image on a display screen of the user's computer.

An alternate embodiment of the invention includes a method of obtaining a selectable image. The method includes the steps of receiving a user's request from a user's computer for the selectable image, generating a handle which corresponds to the selectable image based upon the user's request, generating a display description in which the handle is embedded, constructing a reply response containing the display description with the embedded handle that corresponds to the selectable image, and sending the reply response containing the display description with the embedded handle in response to the user's request, wherein the reply response renders the selectable image on a display screen of the user's computer.

Another embodiment of the invention is drawn to a system for attaining a selectable image. The system includes a server configured to receive a request from a user for the selectable image, to generate a handle which corresponds to the selectable image, to generate a display description in which the handle is embedded, and to construct a reply response containing the display description with the embedded handle that corresponds to the selectable image. The server is also configured to send the reply response containing the display description with the embedded handle to the user's computer, wherein the reply response renders the selectable image on a display screen of the user's computer.

BRIEF DESCRIPTION OF THE DRAWINGS

The objects and features of the invention will be more readily understood with reference to the following description and the attached drawings, wherein:

FIG. 4 is a table listing a sample of business rules categories which may be monitored according to one embodiment of the invention.

FIGS. 7A-7E depict the business rule set up procedure according to one embodiment of the invention.

DETAILED DESCRIPTION OF THE PREFERRED EMBODIMENTS

Figure 1A:
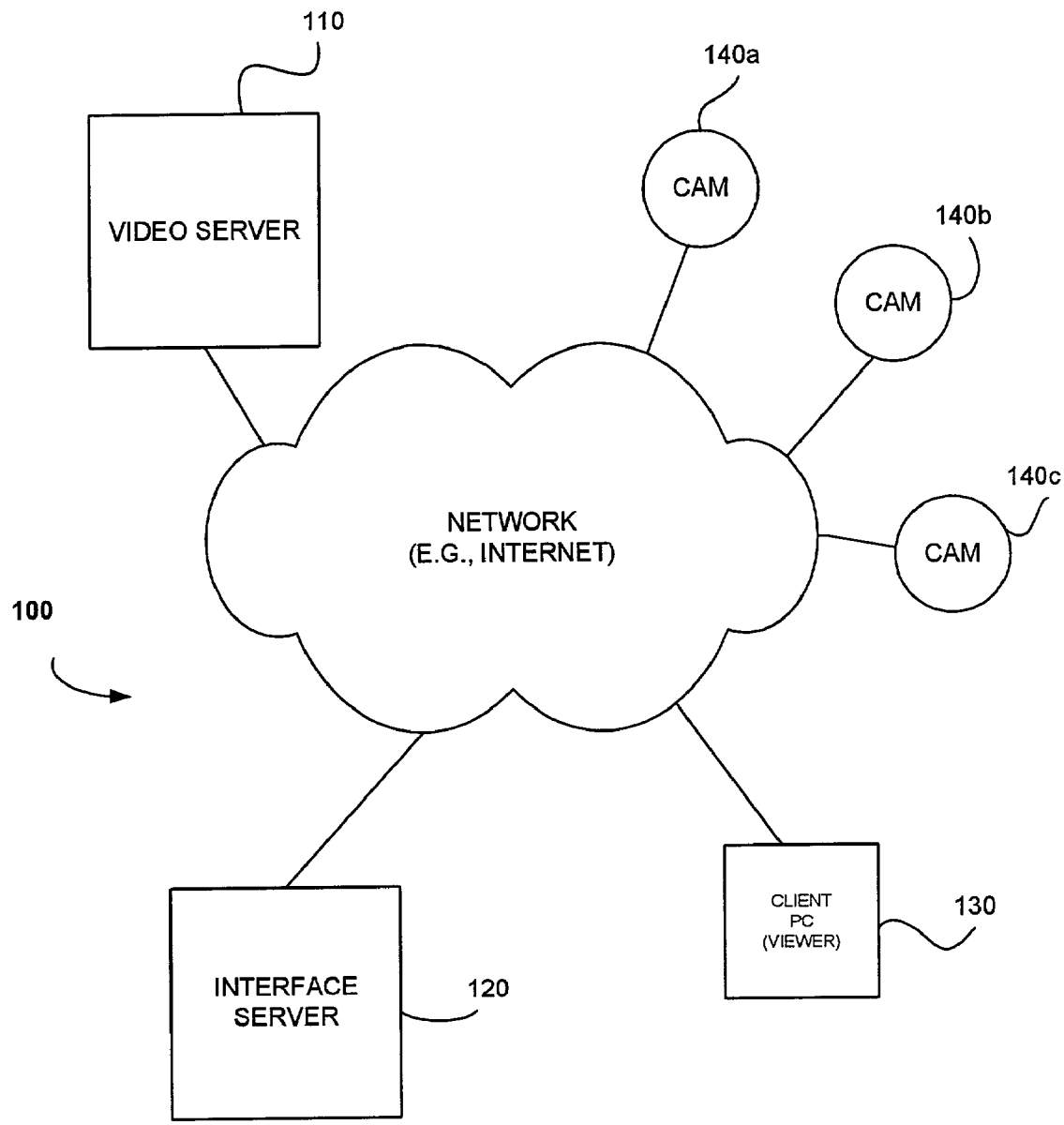
FIG. 1A-1B are block diagrams of a system according to an embodiment of the invention.

FIG. 1A is a simplified block diagram of an exemplary embodiment of a system 100 which may be employed in the invention. In general, the system 100 retrieves snapshot data by employing a sequence of steps that may involve communications between several components over a network such as the Internet, and which may include, a digital video recorder/server (DVR) 110, an interface server 120, a viewer display 130, and video capture devices 140a-140c. Accordingly, each component may be configured to communicate using well known communication standards such as TCP/IP, IPX, etc.

In general, the system 100 provides a user interface that allows the user to view a video sequence via a series of images displayed on a display screen of client display 130. Each of the video sequences may contain one or more "snapshots." A snapshot may be described as a still frame and its ancillary data, a subregion of a still frame, a subrange of the range of spatial frequencies that compose a still frame or a small video sequence. In addition, a snapshot need not be represented internally on a network as a single frame. For example, if the captured video data has been compressed via an inter-frame compression technique such as MPEG (Motion Picture Experts Group), or JPEG (Joint Photographic Experts Group)

then the data from the multiple frames may need to be combined to generate the requested snapshot.

The DVR 110 may be responsible for recording captured video from one or more video capture devices 140*a-c*, recording those video sequences in a database, and transferring selected portions of the video sequences which are stored in the database to other software components upon receiving a request to do so. The interface server 120 may communicate with the DVR 110 to determine what graphical objects should be displayed on the viewer's screen, and to generate a representation of these graphical objects. This representation of the graphical object is then displayed by the viewer display device 130 component. The viewer display device 130 receives "events" such as a data request initiated by a user clicking a mouse, activating a keyboard key, speaking into a voice activated mechanism, touching a touch-activated screen or activating any other command generating device. The viewer display device 130 then converts, for example, the mouse click into an information request transmitted from the user's computer. The viewer display device 130 then transmits the information request to the interface server 120.

Figure 1B:
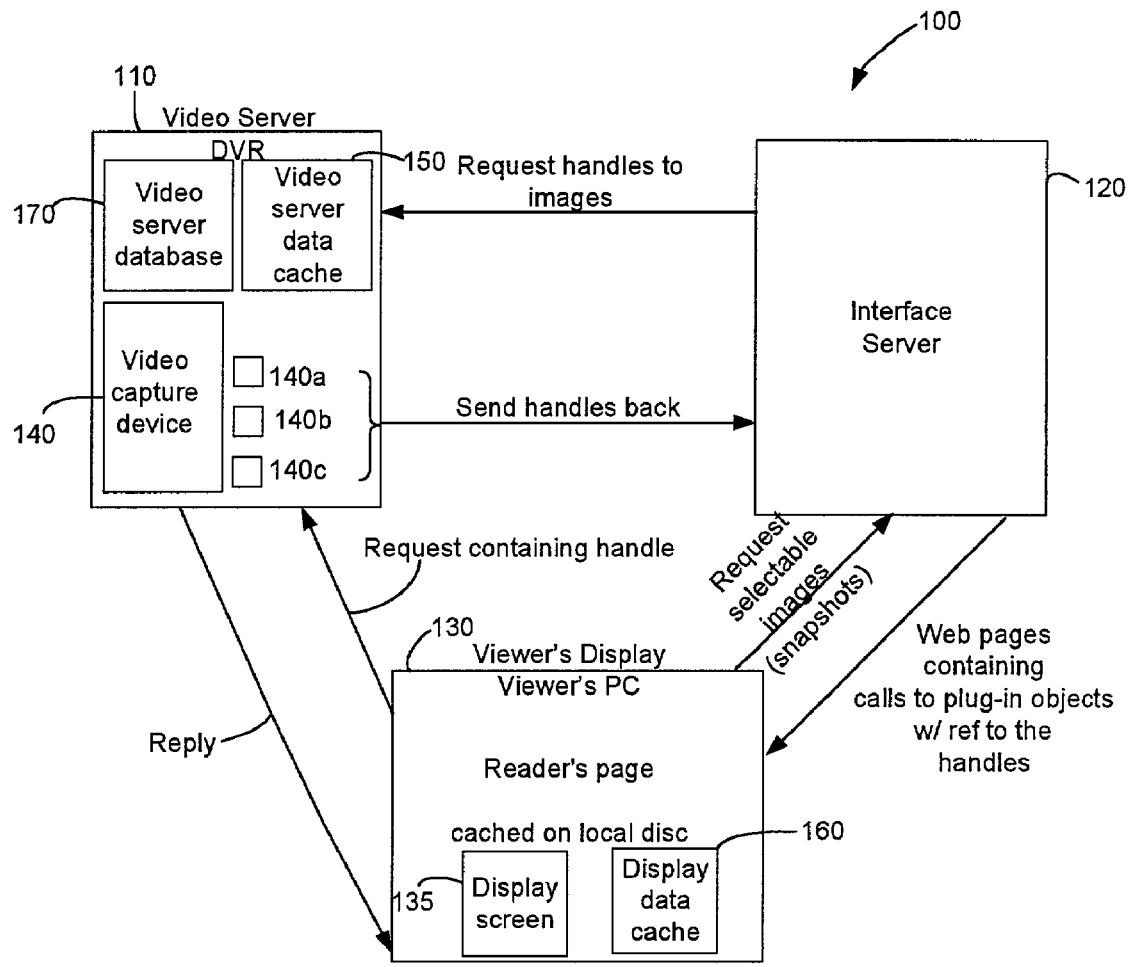

The DVR 110, the interface server 120 and the viewer display device 130 may reside on the same computer or processor, or be connected to separate computers or processors. Alternatively, the DVR 110, the interface server 120, and/or the viewer display device 130 may reside on individual networks or may be are connected to a wide area network (WAN) or to the Internet. As an example, one embodiment of the invention may be configured so that the DVR 110 runs on a first computer at the site where the video capture device 140 resides, as shown in FIG. 1B. A video capture device 140(*a-c*) may be, for example, a camera, a digital camera, a camcorder or any other device which is capable of capturing an image, a sequence of images, or a video sequence. Namely, the images captured by a video capture device 140 may be either a still image, a moving image, a live video or a video clip. A video clip may be a sequence of frames recorded by a single camera or multiple cameras.

During operation of the system 100 when the video capture device 140 (using, for example, cameras 140*a-c*), begins recording the images, the system 100 may also begin to simultaneously generate a video log file for the images being recorded so that the log file stores all the frames recorded by each of the cameras 140*a-c*. The system 100 also enables the user to instruct multiple cameras 140*a-c* to record simultaneously with different frame rates for each camera. Thus, the system 100 provides the user with the option of constructing a capture schedule, which lists all the desired specified frame rates for each camera 140.

The interface server 120 shown in FIGS. 1A and 1B may be a web server program running on a second computer as discussed above. The interface server 120 may communicate with multiple independent video servers and/or multiple independent viewer display devices. The viewer display device 130 may be a web browser running on a third computer.

The embodiments described herein are merely exemplary, and the invention is not limited to such exemples. Other embodiments would be obvious to one of ordinary skill in the art after reading this document and the accompanying figures. For instance, in another embodiment, the interface server 120 and the viewer display device 130 may be merged into a single software program that runs on the viewer's computer. Alternatively, the system 100 may be configured so that the DVR 110, the interface server 120, and the viewer display device 130 are separate components that run on a single computer.

According to one embodiment of the invention, the system provides an apparatus and a method whereby a user can improve the management of his business by viewing segments of saved videos recorded on one or more cameras. The video segments may be saved on different cameras at different time intervals. Therefore, when a user enters a request to view an event which was recorded by one or more of the cameras, the invention is capable of regrouping and categorizing the stored video data to locate the snapshot of the requested event so that the user can systematically view the requested event. Accordingly, the invention may be used by a user as either a business management tool or a remote monitoring system.

For example, the invention may be used as a business management tool by employing a business rules engine functionality that allows a user to better manage his business through the use of a visual information management concept. The invention employs the visual information management concept so that visual data, still frames and video are treated as data, which is utilized to better manage a business in a manner similar to the traditional use of numerical or textual data. According to this embodiment, the system 100 provides a comprehensive listing of searchable business rules, such as cleanliness, productivity, shrinkage (theft), customer throughput (the time a customer waits for service) and liability claims. A business rule search enables a user to monitor the daily events that occur within the business that may affect the business' productivity and profitability. A business rule defines a set of cameras and other criteria for the video from those cameras, such as a time interval. For instance, a business rule search based upon "customer throughput" enables a user to view a set of snapshot images of customers being serviced throughout a normal business day to determine, among other things, bottlenecks that the business may suffer in servicing its customers. Therefore, use of the "customer throughput" business rule by the system 100 may aid a user in detecting deficiencies in its customer service procedures or detect other inefficiencies with its current business methods. Once the shortcomings of the business have been pinpointed by the use of the system 100, a user can use this information to improve the business' productivity and generate additional revenue dollars or fewer expense dollars.

Alternatively or conjunctively with using a time interval as the criteria for the cameras, a business rule may use criteria based on video content, video activity, or telemetry data associated with the video stream. An example of a criterion based on content might be "two or more people in view". This would yield a set of snapshots, from the cameras associated with the business rule, that contain two or more people. An example of a criterion based on activity might be "motion in more than 10% of the view for more than 2 seconds". This would yield a set of snapshots, from the cameras associated with the business rule, that contain the specified amount of motion. An example of telemetry data associated with the video stream is point-of-sale (POS) data from a cash register. An example of a criterion based on such telemetry data might be "refunds larger than $100". This would yield a set of snapshots, from the cameras associated with the business rule, corresponding to such cash register transactions.

Alternatively or conjunctively, the invention may be used as a monitoring system, such as for security purposes or a healthcare monitoring service. For example, if a person discovers that one of the store windows has been broken, he may use the system 100 to locate the video segment or video segments that show when the breakage occurred. To locate when the window was broken, the user may enter a request on the system 100 to locate the video segments recorded by the cameras focused on the broken window. Upon entering the request, the user may initially establish certain search criteria, for example, the time interval in which he suspects that the breakage may have occurred and the number of video segments to be retrieved. Based upon the user's request, the system 100 will provide an interface to allow the user to perform a drilldown search to locate the requested video segments. Specifically, system 100 will render the number of requested video segments upon the display screen 135. If the images initially displayed upon the display screen 135 do not reveal when the window was actually broken, the user may use a drilldown button 320 (a dot link button) (see FIG. 5A) to further drill down from the initially requested video segment until the video segment which shows the window being broken has been located.

FIG. 2 illustrates an example of the process and operations of system 100 according to one embodiment of the invention. As shown in FIG. 2, with continued reference to FIG. 1B, the process begins at step 500. In step 510, the user activates the viewer display device 130 to send a request that will obtain snapshots of images for a particular video clip. As part of the request in step 510, the user initially establishes various search parameters that describe the images to be retrieved. For example, the user may request three snapshots spaced at equal time intervals between 9:00 a.m. and 11:00 a.m. from three different cameras 140*a-c*.

In step 520, the process transmits the request to the interface server 120.

In step 530, the interface server 120 refines and/or recodes the request based on the internal database of the interface server 120. For example, the interface server 120 may need to consult its internal database to determine which DVR 110 holds the requested snapshot of the video. The interface server 110 then constructs a request to retrieve the requested snapshots from the DVR 110 which holds the video by refining the request received from the viewer display device 130.

In step 540, the interface server 120 sends the refined request to a server, such as DVR 110.

In step 550, upon receipt of the refined request, the DVR 110 queries its database of video frames (video server database 170) to process the refined request. The data stored in the video server database 170 may be stored as a combination of disk files, and/or internal or external network memory devices. In step 550, the DVR 110 queries the video server database 170 and identifies the data that satisfies the refined request. For example, if the request is for three snapshots spaced at equal time intervals between 9:00 am and 11:00 am from the three cameras 140*a-c*, the DVR 110 may then identify nine snapshots (three snapshots from camera 140*a*, three snapshots from camera 140*b*, and three snapshots from camera 140*c*).

In step 555, the DVR 110 then saves the snapshot data as separate files in a video server data cache 150 for temporary storage and fast access of the snapshot data. The video server data cache 150 then stores the data either on disk or in an internal or external memory device. Caching the snapshot provides a useful benefit to the invention. For instance, if another request for the data associated with the previously requested snapshot is received within a preset time period and if the data of the snapshot is already stored in the video server data cache 150, the DVR 110 may skip the step of querying the video server database 170.

In step 560, the DVR 110 constructs a reply message that contains "handles" that correspond to the retrieved images. An image "handle" is a representation or another identification scheme that contains data that will allow an application to request the snapshot of an image from the DVR 110. A "handle" may be a data string that serves as a hash or lookup code, a data string that causes a set of instructions to take place, or simply a specific memory address or address range.

In step 570, the DVR 110 sends the collection of handles back to the interface server 120.

Upon receipt of the handles in step 580, the interface server 120 uses its internal logic to generate a new interface display description in which the handles are embedded. The display description may define how the handles interact with each other so that the images can be rendered sequentially on the display screen 135 or arranged according to any other user-defined format.

In step 590, the interface server 120 sends the display description, with the embedded handles, to the viewer display device 130. The viewer display device 130 then retrieves the display description and images in step 600.

As part of the retrieval process, in step 610, the viewer display device 130 consults the display data cache 160 to determine if the request or part of the request can be satisfied without having to obtain data from the DVR 110. Namely, the viewer display device 130 consults the display data cache 160 to determine if the requested snapshot is, or relevant parts thereof, are already stored in the display data cache 160.

If so, the process advances to step 620 and retrieves the data. In step 630, the process determines whether additional data is needed to completely render the snapshot. If the response to the inquiry in step 630 is negative, the process advances to step 690 in FIG. 2D. If the response is YES in step 630, in order to render the image, the process will retrieve the needed snapshot data from the DVR 110. The data retrieved may be either a complete snapshot to use instead of the cached portion, or may be information which, when combined with the cached portion, comprises the requested snapshot. The process proceeds to step 640.

In step 640, the viewer display device 130 uses one or more of the handles, as well as the information about the needed snapshot data, to construct a request for one or more snapshots from the DVR 110.

Upon receipt of the snapshot request in step 640, the DVR 110 locates the snapshot data by first checking to see if the data was cached in the video server data cache 150. In step 650, the process determines whether the snapshot is already stored in the video server data cache 150. If so, the process advances to step 660 and retrieves the data from the video server data cache 150. In step 670, the process determines whether additional data is needed to completely render the snapshot. If YES, the process proceeds to step 680. If the response to the inquiry in step 670 is negative, the process advances to step 690 in FIG. 2D.

If the snapshot is not already stored in the display data cache 150, the process advances to step 680. In step 680, the DVR 110 queries the video server database 170 to locate the snapshot data. The snapshot data may optionally be combined with the data retrieved in step 660.

In step 690, the DVR 110 sends the located snapshot data back to the viewer display device 130.

In step 700, upon receipt of the snapshot, the viewer display device 130 combines the snapshot data with any data retrieved from the display data cache 160 and then displays the resulting image of the snapshot on the display screen 135.

In step 710, the viewer display device 130 writes the combined data to the display data cache 160. Writing the combined data to the display data cache 160 benefits the system 100 if the viewer display device 130 receives a subsequent request for any portion of the combined data within a pre-set time. Namely, the data may be read directly from the display data cache 160 instead of requesting the data from the DVR 110.

Figure 2A:
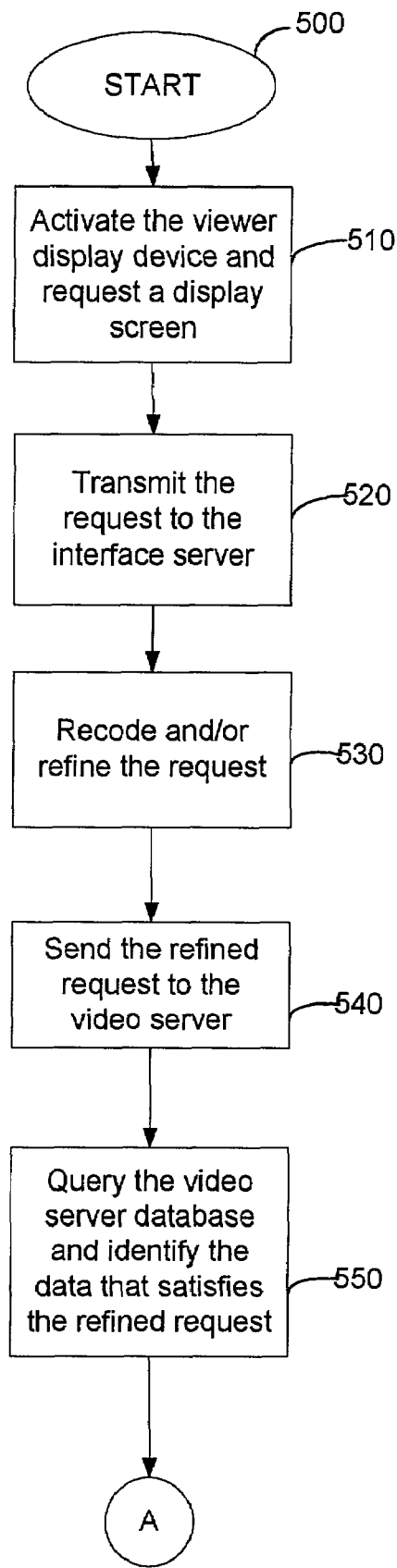
FIGS. 2A-2D are flow charts illustrating one example of the method according to the invention.
Figure 2B:
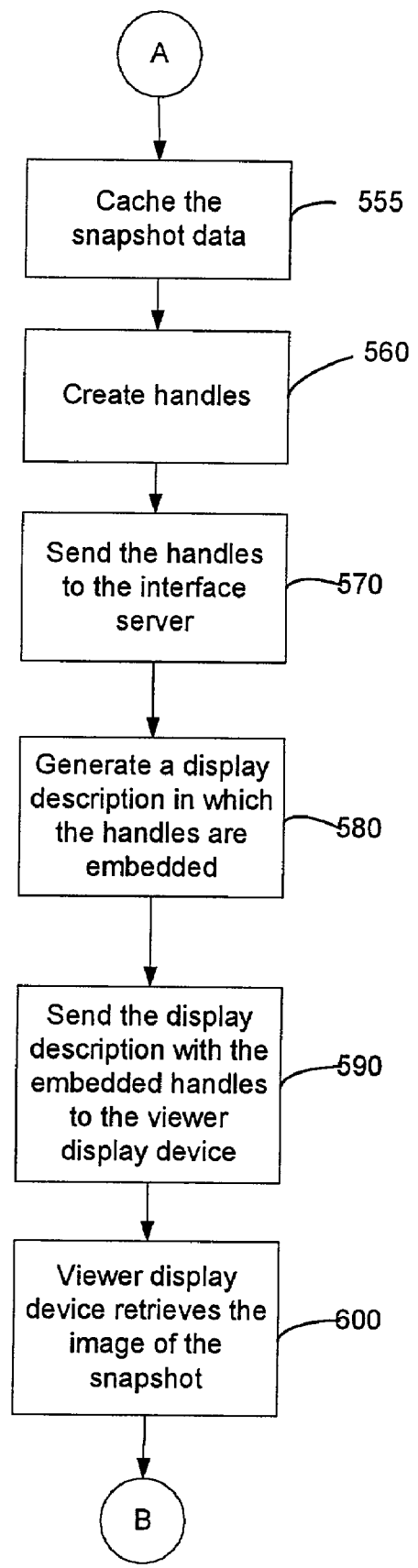
Figure 2C:
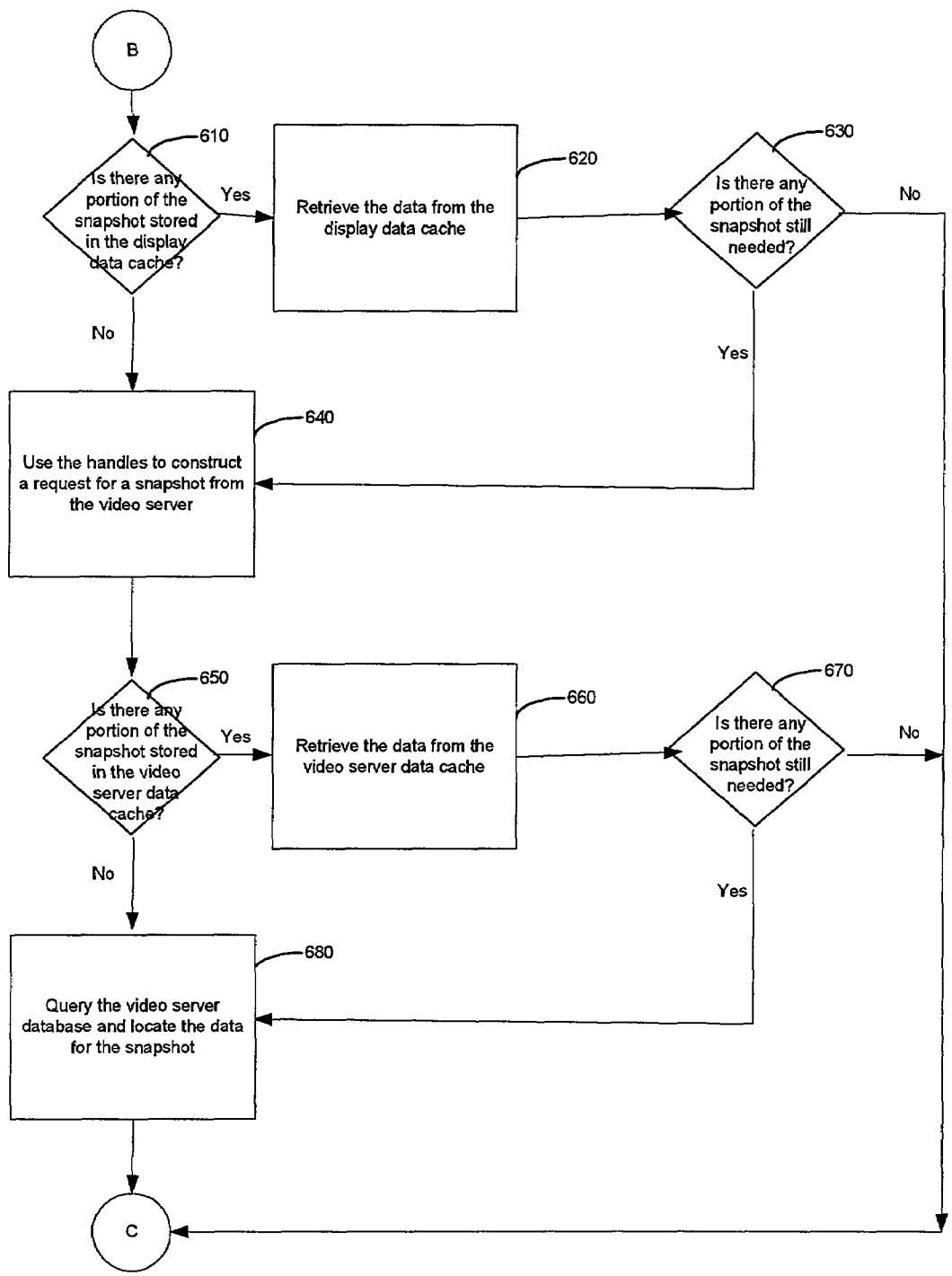
Figure 2D:
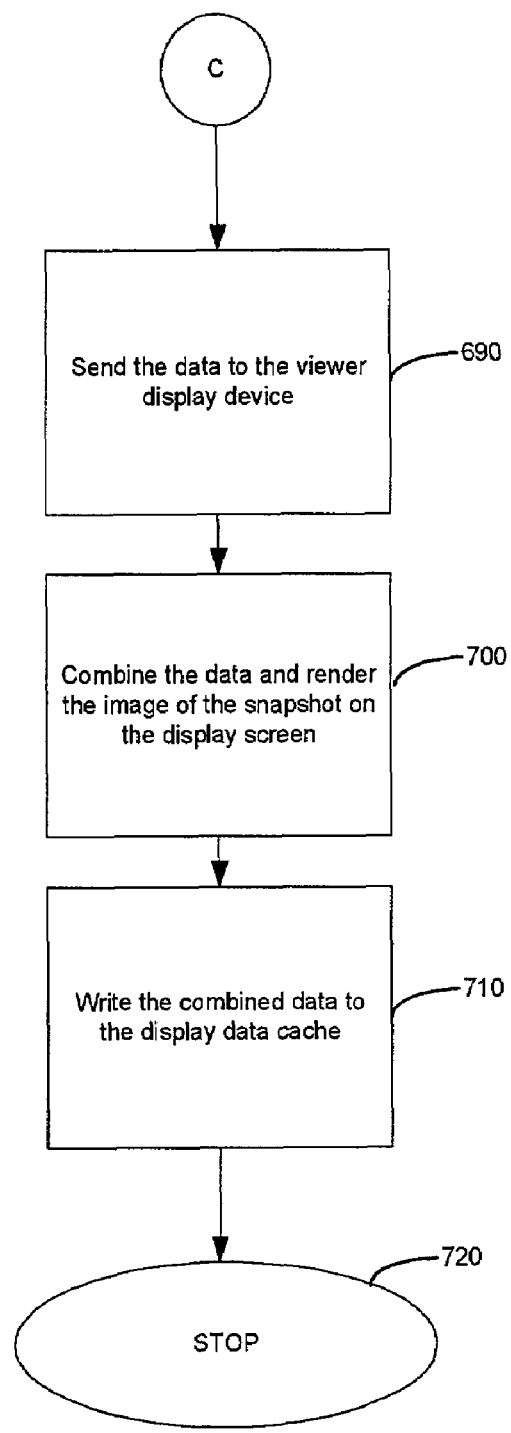

Although FIG. 2D indicates the end of the process in step 720, the process disclosed in FIGS. 2A-2D is iterative. Thus, the viewer display device 130 may repeat the process until all of the snapshot data specified for a specific requested video has been acquired and the images have been rendered on the display screen 135. The use of handles in this embodiment may permit the viewer display device 130 to communicate directly with the DVR 110 in order to obtain the snapshot data, instead of having the DVR send the requested snapshot data first to the interface server 120 and then forwarding the snapshot data to the viewer display device 130. Bypassing the interface server 120 may benefit the system 100 by dramatically reducing the bandwidth necessary for the interface server in comparison to a conventional device. Therefore, a large number of viewer display devices may be simultaneously connected to the system 100 of the invention.

In addition, the process shown in FIGS. 2A-2D can be implemented to take maximum advantage of various compressed video representation techniques that support partial transmission of video data. For instance, if a portion of the data for the requested video is already stored in the display data cache 160, the viewer display device 130 can recognize and locate the portion of the data already stored in the display data cache 160. Then, the viewer display device 130 can request from the DVR 110 only the portion of the data that is needed to complete the requested video. For example, many video files such as wavelet and MPEG video representations encode data at varying levels of spatial resolution in such a manner that each level of spatial resolution is largely independent of the other levels. For instance, if the user first requests data to be viewed at a low spatial resolution using the process of FIGS. 2A-2D, the viewer display device 130 may cache this data in the display data cache 160. Then, if the user enters a subsequent request to retrieve the same data but at a higher resolution, then the viewer display device 130 needs to only request the high-resolution information from the DVR 110, and then combine the high-resolution information with the cached low resolution data to generate the image of the requested video. One benefit of the partial data transmission feature is that it minimizes the redundant transmission of data. This feature of this embodiment may be beneficial for obtaining system responsiveness in any networked environment.

Another embodiment of the invention provides that the display data cache 160 can also minimize redundant transmission if the compressed video representation supports temporal decompositions and recombination, i.e., if it allows video data from different overlapping or adjacent frame times to be combined into a single video clip. The system 100 may employ temporal decomposition to handle signals which are sampled with different sampling rates. For example, a user may first request every kth frame (where k is an integer) of video within a defined time period. If the viewer display device 130 caches the data in the display data cache 160 and if the user then subsequently requests every k/nth (where n is an integer) frame of video within the defined time period, then only the $(n-1)/n$ request frames need to be obtained from the DVR 110. For example, if a user first requested every 8th frame of a video (i.e., k=8) spanning a pre-defined time period and if the user then enters a second request requesting every 2nd frame (i.e., n=4 and k/n=2) spanning a pre-defined time period, the invention may use the $(n-1)/n$ equation to determine that only three-fourths of the frames in the user's second request are not already stored in the display data cache 160 and need to be retrieved from the DVR 110 in order to render the images of the requested snapshot.

Another example might exist if the user requests video from two overlapping time periods. For example, if the user first requests video spanning the time period from 8:00 a.m. to 10:00 a.m., and then conducts a second request for a video spanning the time period from 9:15 a.m. to 11 a.m., for the second request, the viewer display device 130 needs to retrieve only the video from 10:00 a.m.-11:00 a.m. from the DVR 110, since the overlapping data from 9:15 a.m.-10:00 a.m. is already stored in the display data cache 160.

Video data temporarily stored in the video server data cache 150 may be expunged by a checking process that runs on the DVR 110 to check whether the data cache has grown above a predetermined physical size or whether the data has been in the cache without being accessed for a preset period of time. This checking process can be set up to run periodically and/or whenever a file is added to the cache. Video data in the display data cache 160 may be expunged via a similar mechanism running on the viewer display device 130.

It should be apparent to one skilled in the art that the embodiments described in FIGS. 1A-2 can be easily extended to situations where the requested snapshots correspond to videos that are dispersed on multiple video servers. In such an embodiment where multiple video servers are employed in the invention, in FIGS. 2A-2D, the interface server 120 sends the appropriate requests to each of the relevant video servers and combines the handles received from each video server to generate the interface display description, which will be sent to the viewer display device 130. The viewer display device 130 will continue to contact the relevant video servers until all of the snapshot data has been obtained.

In an alternative embodiment, the interface server 120 may be a central web server program running on a central web server computer and the viewer display device 130 may be a user web browser running on a user's computer. In this embodiment as illustrated in FIG. 3, the process begins in step 800 when the viewer activates a selectable icon such as a "submit" button on a web page. The icon may be a graphical image that represents the topic or information category of another web page. The icon may be a hypertext link to another web page. By activating the icon, a Hypertext Transfer Protocol (HTTP) request is transmitted to the central web server in step 805. HTTP is an example of a set of rules for exchanging files (text, graphic images, sound, video, and other multimedia files) on the World Wide Web. HTTP is an application protocol. As an example, the request might be for a set of snapshots from certain cameras every hour between 9 a.m. and 5 p.m. on Dec. 28, 2002.

In step 810, the central web server receives the request and queries its internal Structured Query Language (SQL) database (other object oriented or relational databases may be used in accordance with the present invention) to determine the relevant video servers and their Internet Protocol (IP) addresses. Each computer on the Internet has at least one IP address that uniquely identifies it from all other computers on the Internet. The process uses the IP address to send the data from one computer to another computer over the Internet. In step 815, the central web server then invokes a software component that connects to each DVR 110 and requests the snapshot handles.

In step 820, the video server selects the relevant frames from the video log file and sends the handles back to the central web server software component as Extensible Markup Language (XML) text strings. XML is a flexible way to create common information formats and share both the format and the data over the World Wide Web, intranets, and elsewhere.

For example, an XML can be used by any individual or group of individuals or companies that want to share information in a consistent way.

In step 825, the central web server then parses the XML text strings and generates a Hypertext Markup Language (HTML) document that contains Uniform Resource Locators (URLs) derived from the XML text strings. HTMLs are a set of markup symbols or codes inserted in a file intended for display on a World Wide Web browser page. The markup symbols tell the web browser how to display a web page's text and images on the user's display screen 135. The URL is the address of snapshot data, usually accessible on the Internet, that can be interpreted by the video server or interface server. The type of file depends on the Internet application protocol. The file may be an HTML page, an image file, a program such as a common gateway interface application or JAVA™ applet, or any other file supported by HTTP. To play back the video clip, the user requests the URL from the video server.

The central web server then sends the HTML document to the user's web browser as a reply to the HTTP request sent in step 810.

In step 840, the user's web browser renders the HTML document. As part of the rendering process, the user's web browser invokes a software component (commonly referred to as an "ActiveX control" or "plug-in") for each embedded URL from which the snapshot data is to be retrieved. The plug-in application is a program that can easily be installed and used as part of the user's web browser to download, install, and define supplementary programs that play sound or motion video or perform other functions.

In step 850, the plug-in parses the URL to determine what data is being requested and then checks the display data cache 160 to see what portions of the requested data are already stored in the cache in step 860.

In step 860, the process determines whether the snapshot is stored in the display data cache 160. If so, the process advances to step 865 and retrieves the data from the display data cache 160. In step 870, the process determines whether additional data is needed to completely render the snapshot. If yes, the process proceeds to step 880. If the response to the inquiry in step 870 is negative, the process advances to step 900.

If the snapshot is not already stored in the display data cache 160, the process advances to step 880.

In step 880, the plug-in then sends an HTTP request (if necessary) to the DVR 110 to retrieve the data for the requested video that was not found in the display data cache 160. Upon receiving the request, the DVR 110 queries the video server database 170 to locate the snapshot data. In step 890, the DVR 110 sends back the requested data to the plug-in as an HTTP reply.

Then in step 900, the plug-in combines the data sent from the DVR 110 with the data retrieved from the display data cache 160 and renders the image of the data on the display screen 135.

Figure 3A:
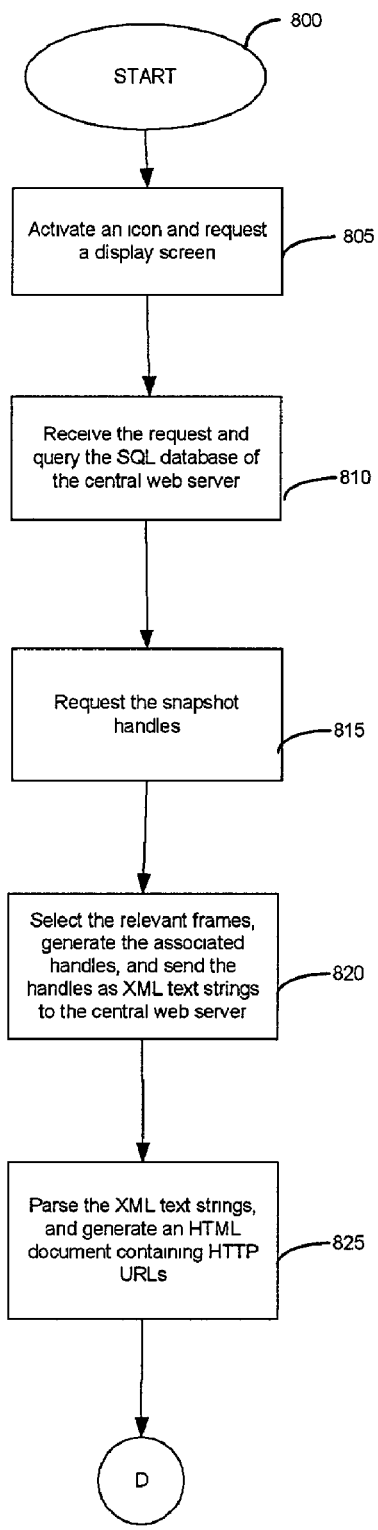
FIGS. 3A-3B are flow charts illustrating another embodiment of the invention operating over the web.
Figure 3B:
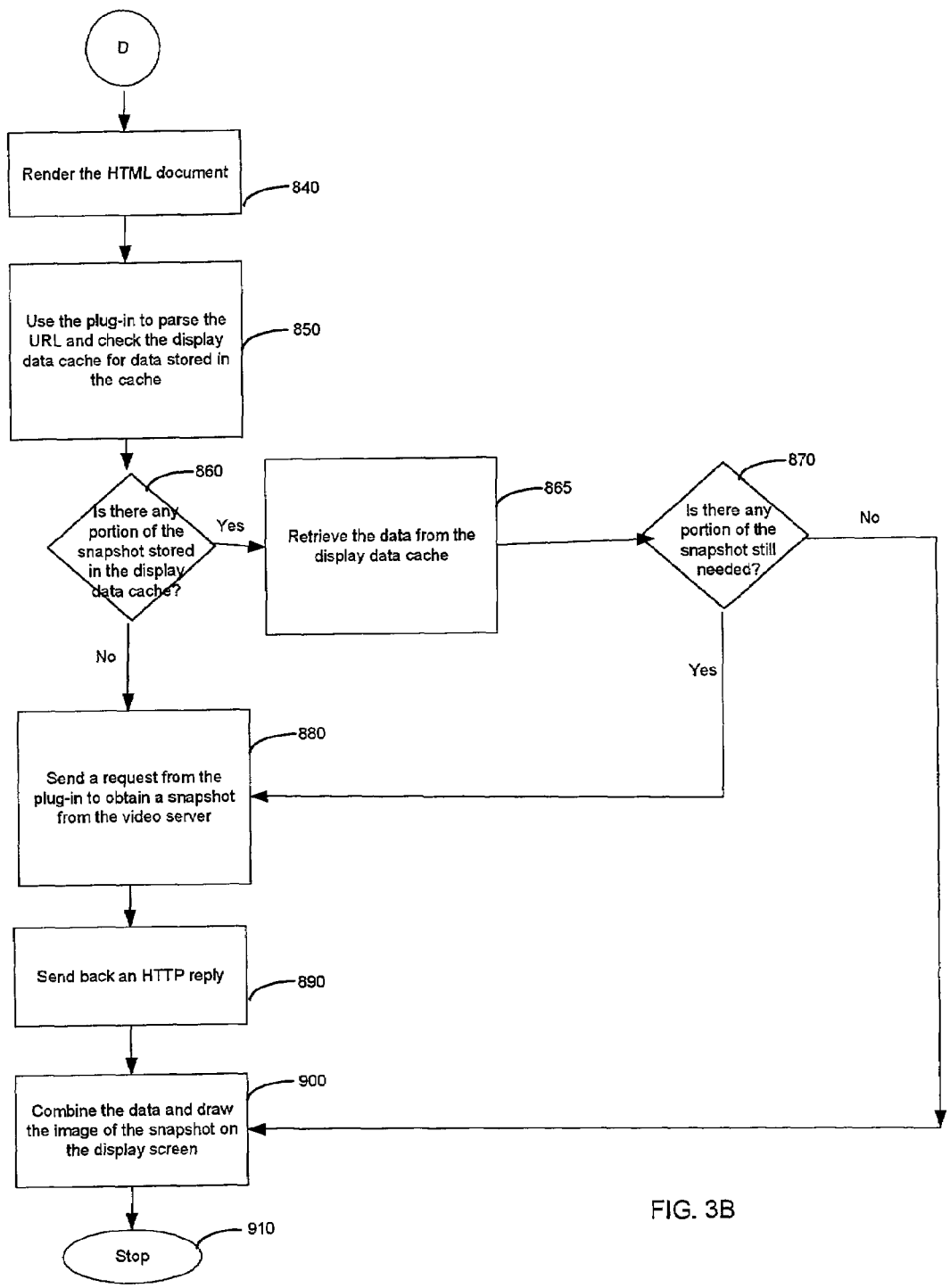

Although FIG. 3B indicates the end of the process in step 910, the process disclosed in FIGS. 3A-3B is iterative. Thus, the user web browser repeats the process until all of the snapshot data for a specific requested video has been drawn on the display screen 135.

As an alternative to the above embodiment in FIGS. 3A-3B, the steps performed by the plug-in software component may be performed by a web browser instead of by the plug-in software component. For example, many web browsers have built-in support for JPEG images and if the video data can be transmitted as JPEG images then the use of a software plug-in may be omitted.

In another embodiment, if the handles generated by the DVR 110 follow a known syntax, then the process may be simplified by having the central web server, which functions as the interface server in this embodiment, generate the handles without obtaining the handles from the DVR 110.

In another embodiment, the communication between the DVR 110, the interface server 120 and the viewer display device 130 may occur via a variety of transport mechanisms, including network traffic or simply via shared memory.

A description of exemplary components which may be employed in the invention will now be provided.

In one embodiment of the invention, the system 100 may be configured to provide a business rules engine whereby a user may supervise the management of his business by viewing segments of saved video from one or more pre-defined cameras at one or more pre-determined points in time. The business rules engine of the system 100 can permit the grouping and categorizing of past events for systematic viewing at a later time. The business rules engine may reside anywhere on system 100, but preferably, includes an interface accessible via a network.

Although the business rules engine of the system 100 can be used as a surveillance device, the business rules engine of the system 100 may also be used as a business management tool. Visual data, still frames or video are treated as data and may be utilized to better manage an enterprise in a manner similar to the way that numerical or textual data is traditionally used.

FIG. 4 provides a sample listing of some categories of business rules which may be monitored using the invention. Business rules are performance features of a business that the management of the business may wish to monitor in order to control a particular aspect of the business. The business rules categories can include, for example, cleanliness, productivity, shrinkage (theft), customer thoroughput and liability claims. For instance, by viewing images of customers being serviced through a normal business process a user of the business rules engine of the system 100 may be able to determine, among other things, bottlenecks in the system or inefficiencies that can be improved. Employing the business rules engine of the system 100 to observe a business' customer and to manage the observed business rule may achieve better productivity, ideally translating into additional revenue dollars or fewer expense dollars.

It is to be noted that a business rule may or may not be configured with the explicit purpose of yielding quantifiable benefits depending upon how the user initially defines the operating parameters of the system 100. The user may elect to define a business rule for viewing past events that may not necessarily impact the bottom line of a business. For instance, a user wishing to simply view the timeliness and process by which supplies are delivered may develop a business rule entitled "Delivery", that may not necessarily yield a benefit that effects the business' bottom line.

In one embodiment of the business rules engine, a video clip is a sequence of frames from a single camera or multiple cameras. To play a video clip, the web interface allows the user to select the video log file from which the clip is to be retrieved, together with the following: a specification of which camera is to be retrieved, the start and end time of the video to be retrieved, and the spacing between the frames.

The process of retrieving the desired video clips may incorporate a search mechanism called "thumbnails." Thumbnails are still images or video images from various intervals within a saved video clip. The invention here combines thumbnails with a drilldown user interface to enable a user of a computerized device to quickly and efficiently locate the particular section of the saved video that may be relevant to the user.

Figure 5A:
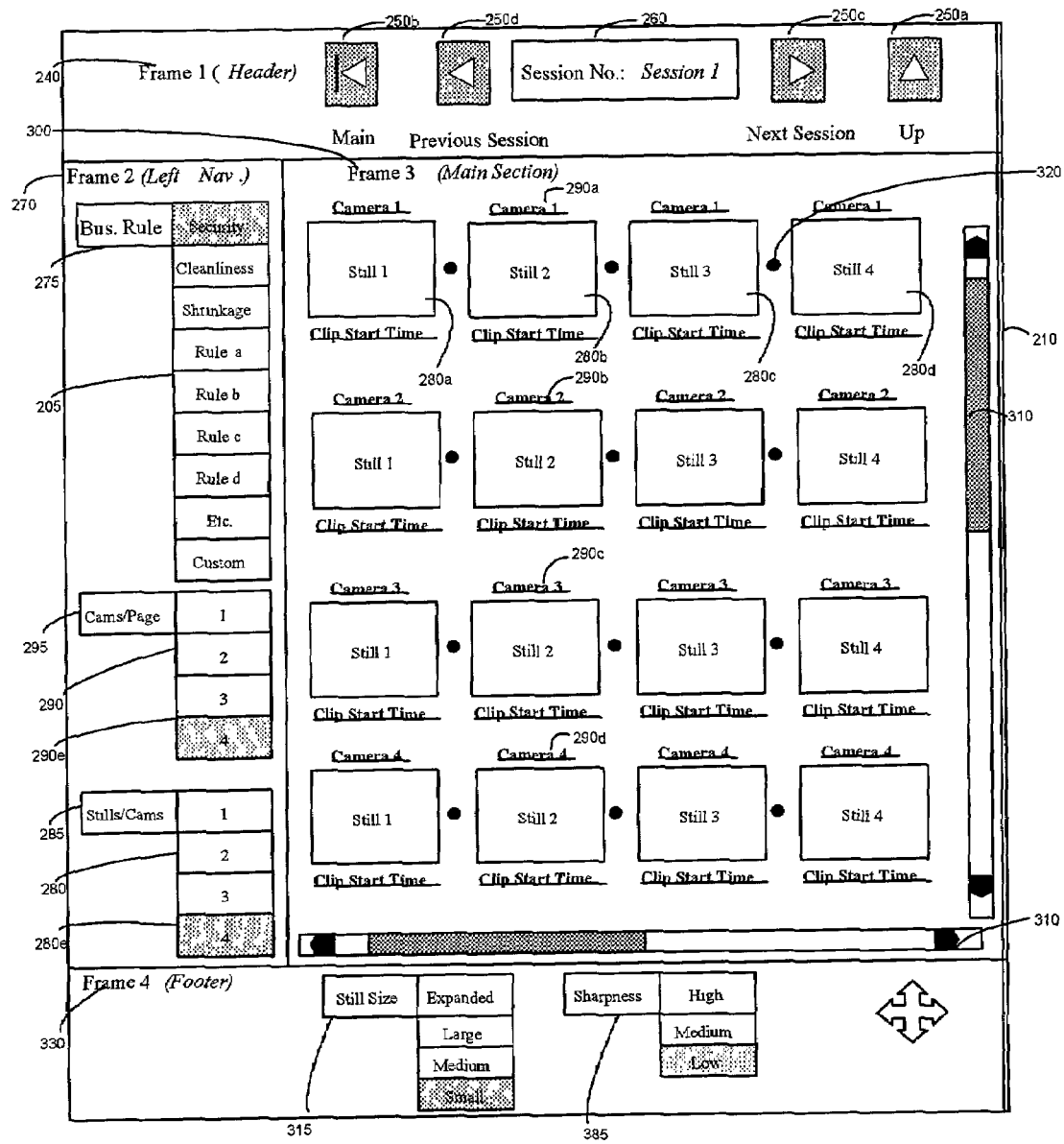
FIGS. 5A-5E are examples of display screen formats, which may be employed in the invention.

As shown in FIG. 5A, a business rules engine interface of the system 100 includes business rules 205. The business rules 205 may be pre-defined business rules, based on specific quantifiable benefits. Alternatively or conjunctively, the business rules engine of the system 100 may enable the user to add to the predefined generic business rules. In addition, the pre-defined generic business rules may be modified or copied, so that the user can rename and save the business rules 205 as desired. The business rule engine of the system 100 may also permit the user to create customized business rules.

Figure 5B:
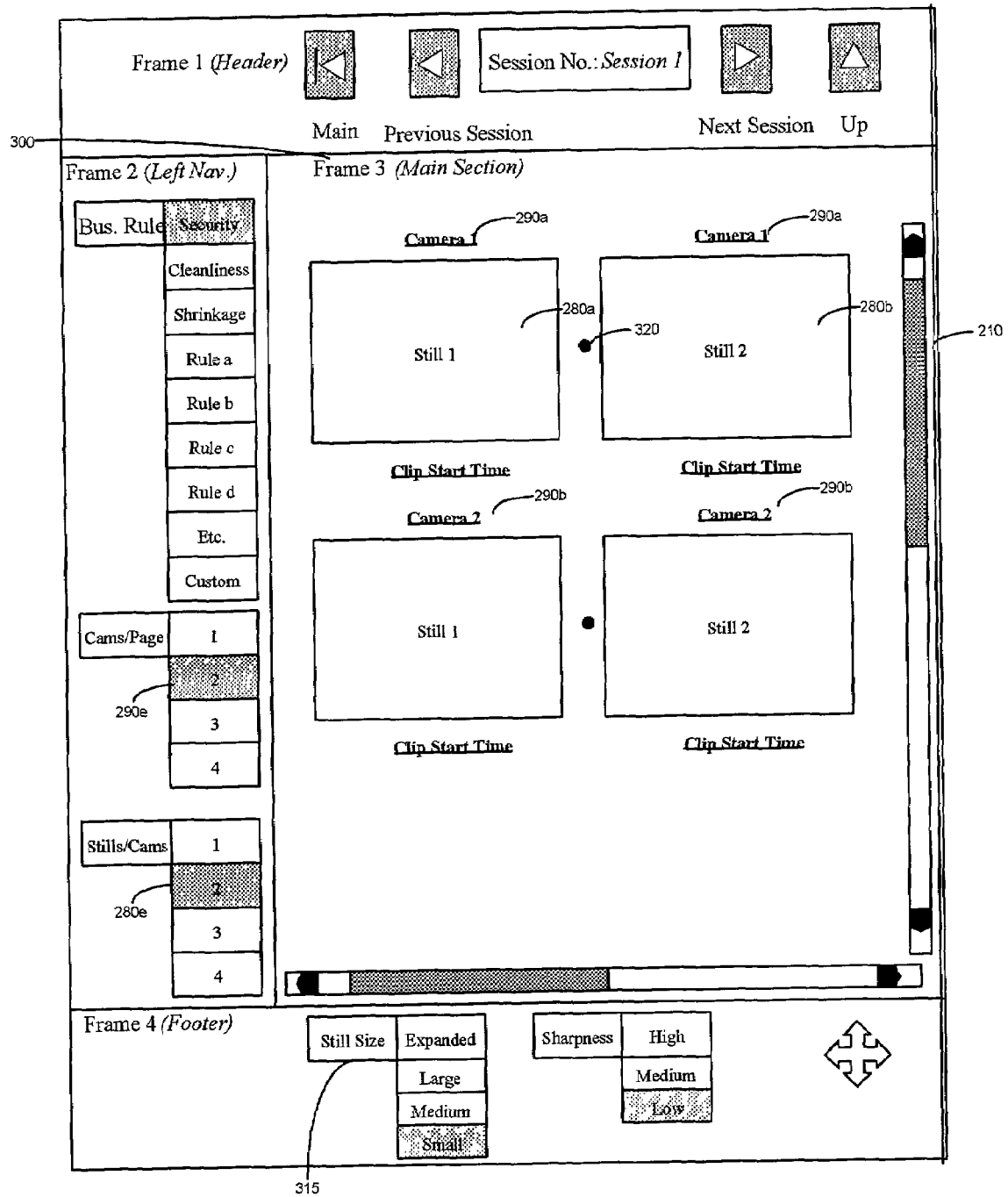
Figure 5C:
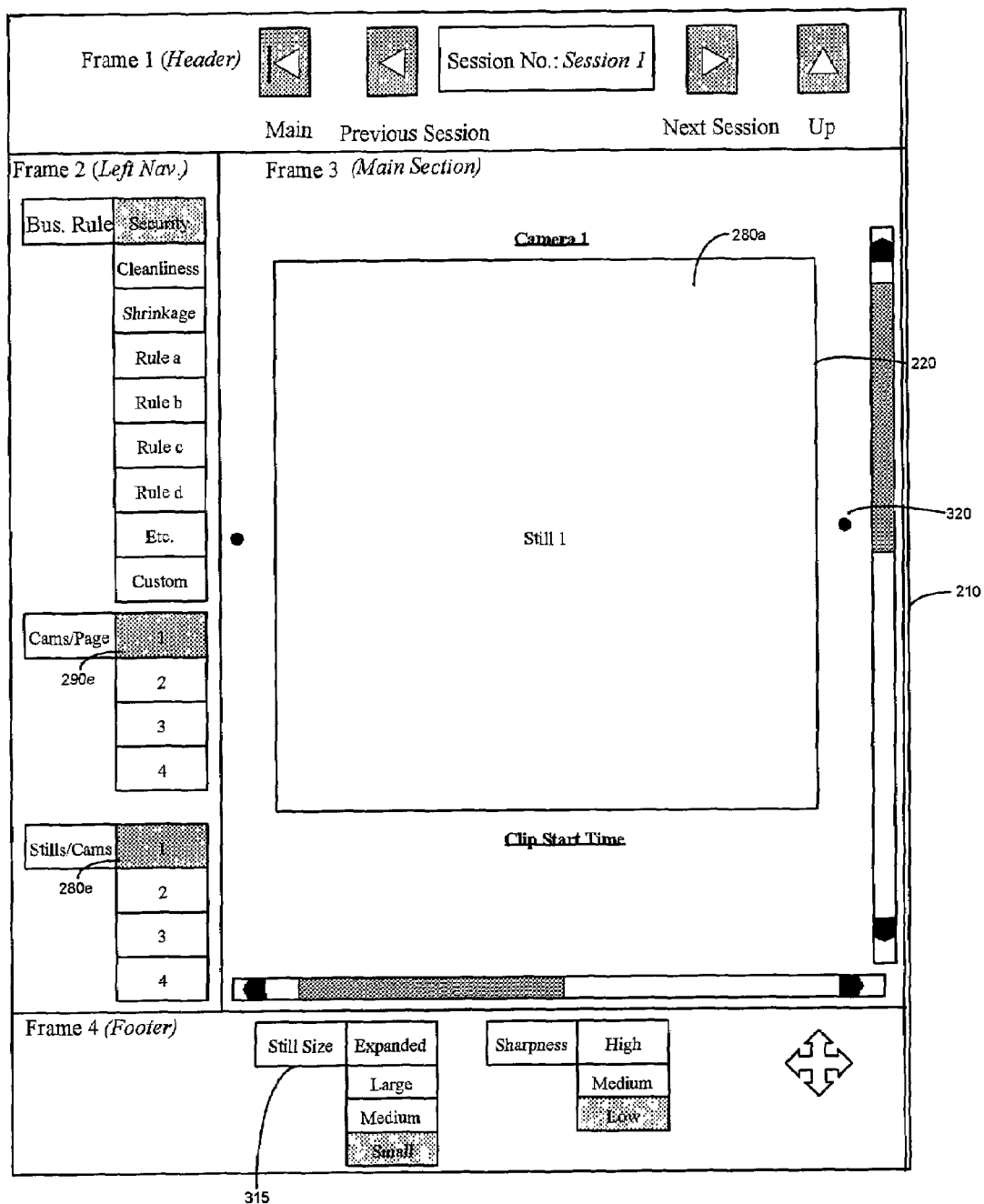

As shown in FIGS. 5A-5C, the business rules engine interface of the system 100 includes a dropdown box capability, so that the business rules 205 can be accessed via a dropdown box 275 that lists the generic and the user-defined business rules.

In addition, the business rules engine interface of the system 100 includes a drilldown capability 320, which may allow the user to drilldown to specific video clips that the user may wish to view. The system 100 may provide multiple screens, which are available to the user so that the user may maneuver to the appropriate video clip. The drilldown capability of the system may include a business rules screen 210 (FIG. 5A), a single camera view screen 220 (FIG. 5C), and a video clip view screen 230 (FIG. 5E).

As illustrated in FIG. 5A, the business rules screen 210 contains, for example, up to four frames. Frame 1 is a header frame 240, which may be formatted so that the header frame 240 cannot be edited as the user navigates through the business rules section. The business rules screen 210 also contains icons 250a-d for allowing the user to return to any previously viewed page on the website via an UP button 250a or to a main site page via a main or home button 250b. The UP button 250a functions to retrieve all the data necessary to regenerate the immediately displayed prior page that the user was viewing.

A user of the business rules engine of the system 100 may wish to capture a single or multiple time slices per day per camera. These slices may be referred to as "sessions" 260. Each business rule 205 may require a different number of viewing sessions 260. For example, in order to monitor the business rules category "security", a user may want to record the activities that occur at the front door camera at two time intervals during a 24-hour period, i.e., during the store's opening time and the store's closing time. These two timing intervals may be considered as two separate sessions.

Frame 2 may function as a navigation bar 270 containing a dropdown list 275 of all the business rules 205, a dropdown list 295 for changing the number of cameras 290 shown per web page, and a dropdown list 285 for setting the number of stills of the requested video images 280 shown per web page (if the business rule contained more than one camera and/or stills of the requested video images). The business rules dropdown menu 275 enables the user to instantly view any of the other business rules in order to select a different rule. With the cameras/page dropdown menu 285 the user selects the number of cameras 280 that the user wishes to view per "virtual page" or web page. If the number of stills 280 from all the cameras 290 in the selected still size cannot be accommodated in the browser window, then the user may use the browser scroll bars 310 in Frame 3 to scroll up, down, left or right, as necessary to view the stills 280 that are currently out of view.

Frame 3 is configured to be the main section 300 of the business rules screen 210. The main section 300 of Frame 3 may be described as a portal into a large canvas that comprises multiple sessions, which in turn may include multiple "virtual" or web pages, containing the actual still images 280 being viewed.

The still images/camera dropdown menu 285 permits the user to modify the number of images 280 per camera shown per web page. In order to change the displayed size of the stills on the page, the user activates the still size dropdown menu 315 found in Frame 4. The right and bottom scroll bars 310 in the main section 300 of Frame 3 allow the user to maneuver the window of the business rules screen 210 across to see subsequent stills (if applicable) and down to see other cameras (if applicable). In FIGS. 5A-5C, the still size dropdown menu 315 is used to modify the sizes of the still images 280. In FIG. 5A, the main section 300 of Frame 3 displays a four-by-four format. In FIG. 5B, the main section 300 of Frame 3 displays a two-by-two format. In FIG. 5C, the main section 300 of Frame 3 displays a one-by-one format. In FIGS. 5A-5C, all of the main section 300 of the Frame 3 display screens may be configured to display essentially the same information, except that the sizes of the still image 280 displayed on the business rules screen 210 have been modified.

In FIG. 5A, Frame 3 is the main section 300 of the business rules screen 210 and contains the still images 280 retrieved from the various cameras 290 based upon the business rules 205 entered by the user. For business rules 205 that comprise multiple cameras 290a-d, still images from each camera may be arranged in rows from top to bottom per page. The user elects to see, for example, only one, two or three cameras, instead of the four cameras shown in the main section 300 of Frame 3 in FIG. 5A. The user may also select a default number of still images to be displayed on the business rules screen 210. Multiple stills images 280a-b recorded over time for the same camera may be shown in a column format configured left to right as shown in FIG. 5A.

Additionally, a dot link 320 may be located between each still image 280 (FIGS. 5A-5E and 6A-6C). The dot link 320 enables the user to navigate to the next screen in order to view intermediary still images recorded during time intervals which occurred between the two still images currently displayed on the business rules screen 210. The system 100 automatically calculates the appropriate time slices between sequential shots and displays the resultant still images. The system 100 uses the dot link 320 as a drilldown feature to locate the snapshots of the desired event. The recorded snapshot data associated with each still image may be stored in a drilldown layer on the system, so that the snapshot data is assigned to a plurality of hierarchical tables or folders. As the user repeatedly activates the dot link 320, the system 100 repeatedly drills down the successive hierarchical layers of the tables to locate the desired snapshot (FIGS. 5A-5E and 6C). The system 100 may be configured to provide one table for each "level" in the drill-down hierarchy, plus another table that defines how the various levels are related hierarchically. For example, if the system 100 is searching for a snapshot of a broken window which may have occurred approximately at 2:00 a.m., the drilldown feature may initially search the tables of the drilldown layer and locate a 12:00 a.m. snapshot, a 2 a.m. snapshot, and a 4 a.m. snapshot. The drilldown feature then splits the drilldown table at 12:00 a.m., and determines if the 2:00 a.m. snapshot is positioned above or below the 12:00 a.m. snapshot within the drilldown table The system 100 then moves down to the 2:00 a.m. snapshot, retrieves the snapshot and renders the image of the snapshot on the primary business rules screen 210. In attempting to locate the desired snapshot, the drilldown feature splits the table based upon the time interval established by the user. A discussion of how the user may establish the time interval is provided below.

For business rules 205 that include more than the number of cameras selected with the cameras/page dropdown menu 285, the user may use the vertical scroll bar 310, which appears on the right edge of the main section 300 of Frame 3 in FIG. 5A, to display the still image recorded on the desired camera.

Frame 4 may be configured as the footer frame 330. The footer Frame 4 contains options for changing the size of the viewed still images 280 per page, via the still size dropdown menu 315, and the changing the sharpness via the sharpness dropdown menu 385. The still size dropdown menu 315 includes, for example, four still sizes: Expanded, Large, Medium and Small, that allow the user to display one, two, three or four still images 280 per camera 290, respectively.

For business rules 205 that include more than one session, a NEXT SESSION button 250c and a PREVIOUS SESSION button 250d is provided, for instance, in the header 240 of Frame 1. If there are no previous sessions, no corresponding PREVIOUS SESSION button 250d will be displayed. Likewise, if there are no next sessions, then there is no NEXT SESSION button 250c displayed on the business rules screen 210.

In FIGS. 5A-5C, only the shaded still images 280e and the shaded cameras 290e are displayed in the main section 300 of Frame 3 of the respective figures. If additional still images exist for a business rule 205, the user may use the arrow button 310 to scroll to the right or left to reveal any additional still images for any additional cameras not presently displayed on the business rules screen 210.

The user may program the system 100 to display a single camera view 220 as shown in FIG. 5C. Alternatively, the user may arrive at the single camera view after having selected the dot link 320 for a specific time interval located between two still images shown on a previous screen. Note that when viewing a single still image on the business rules screen 210 as shown in FIG. 5C, at least one link dot 320 may be positioned on either side of each still image 280 on the business rules screen 210 to allow the user to further drill down.

Figure 5D:
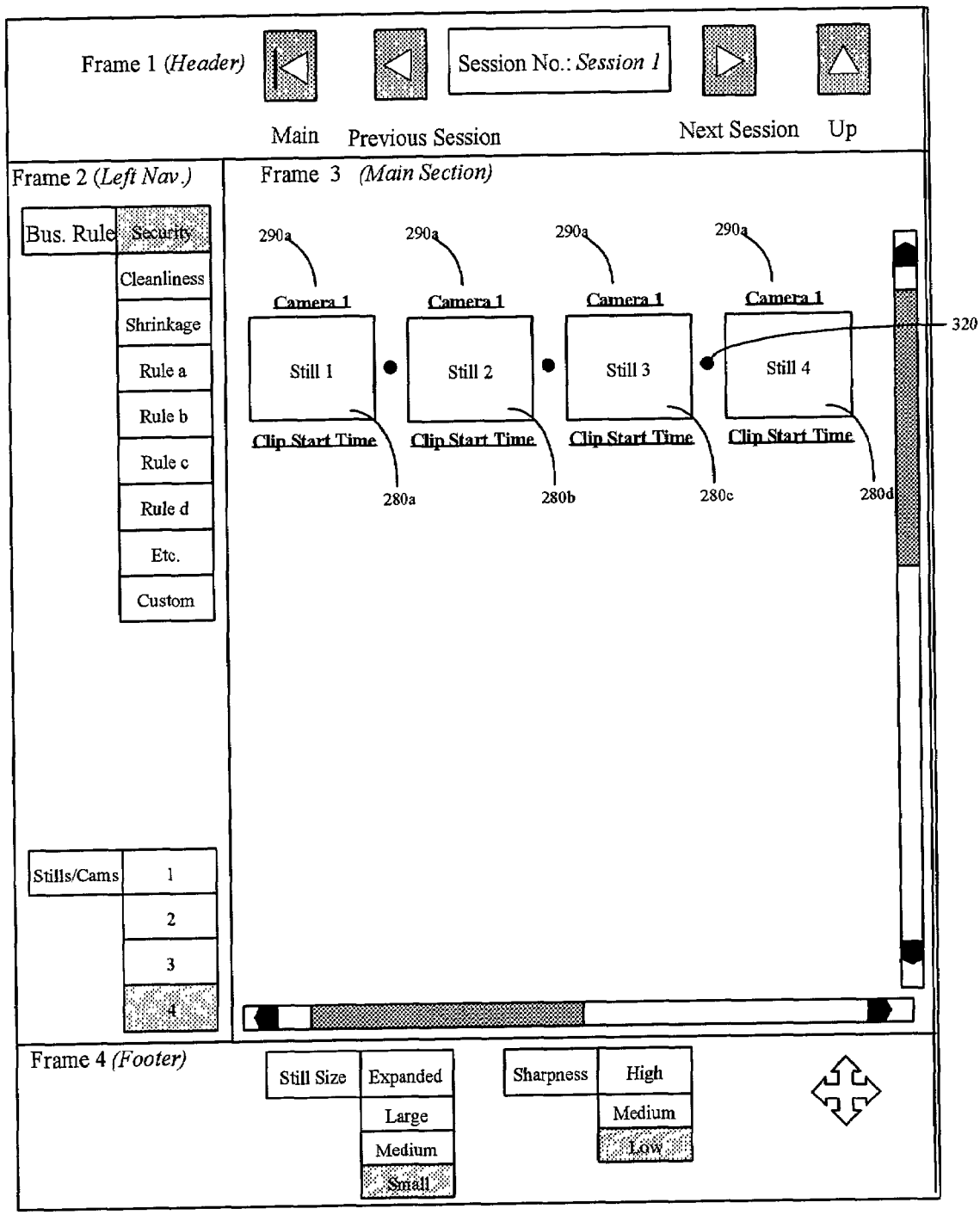
Figure 5E:
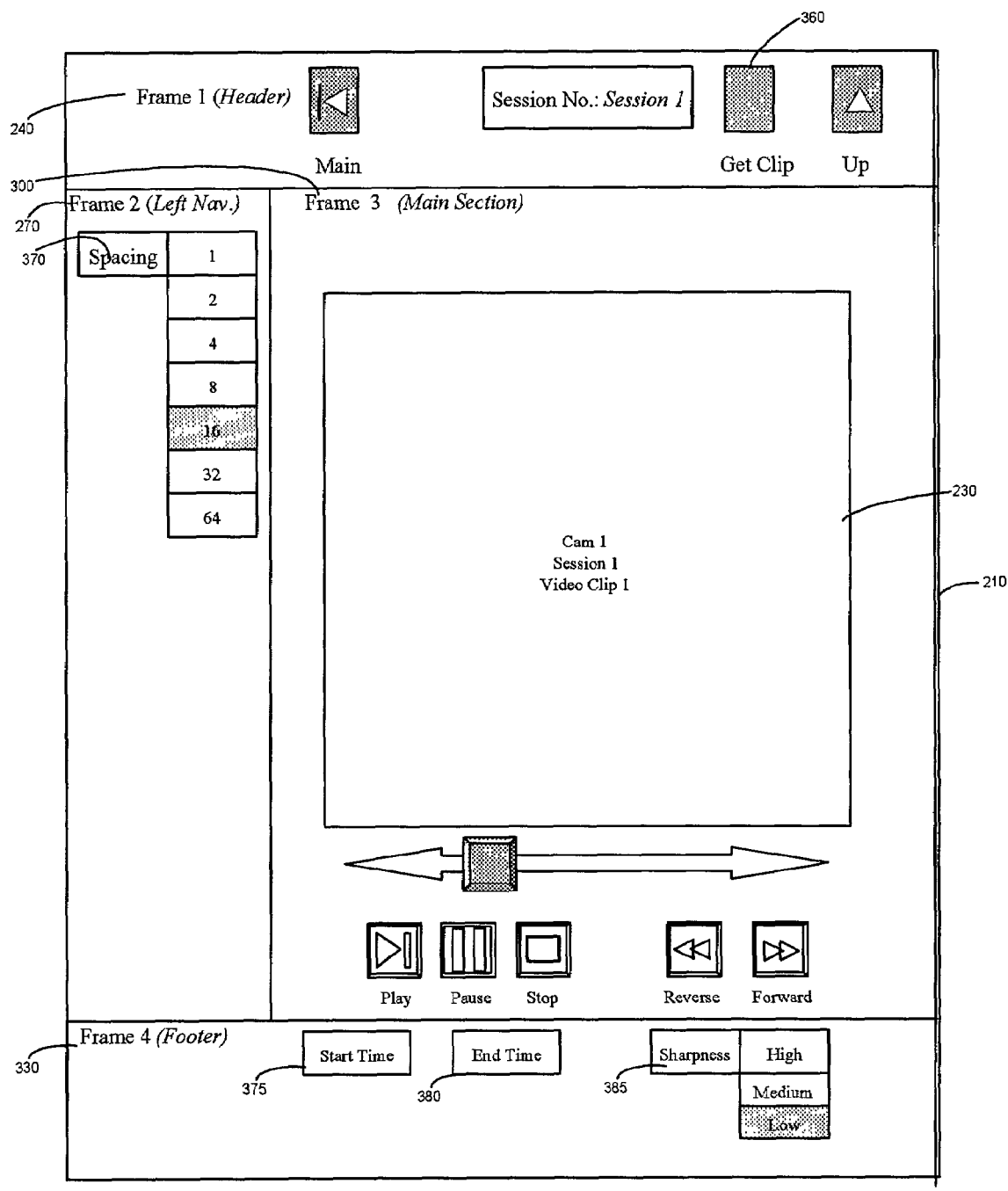
Figure 6A:
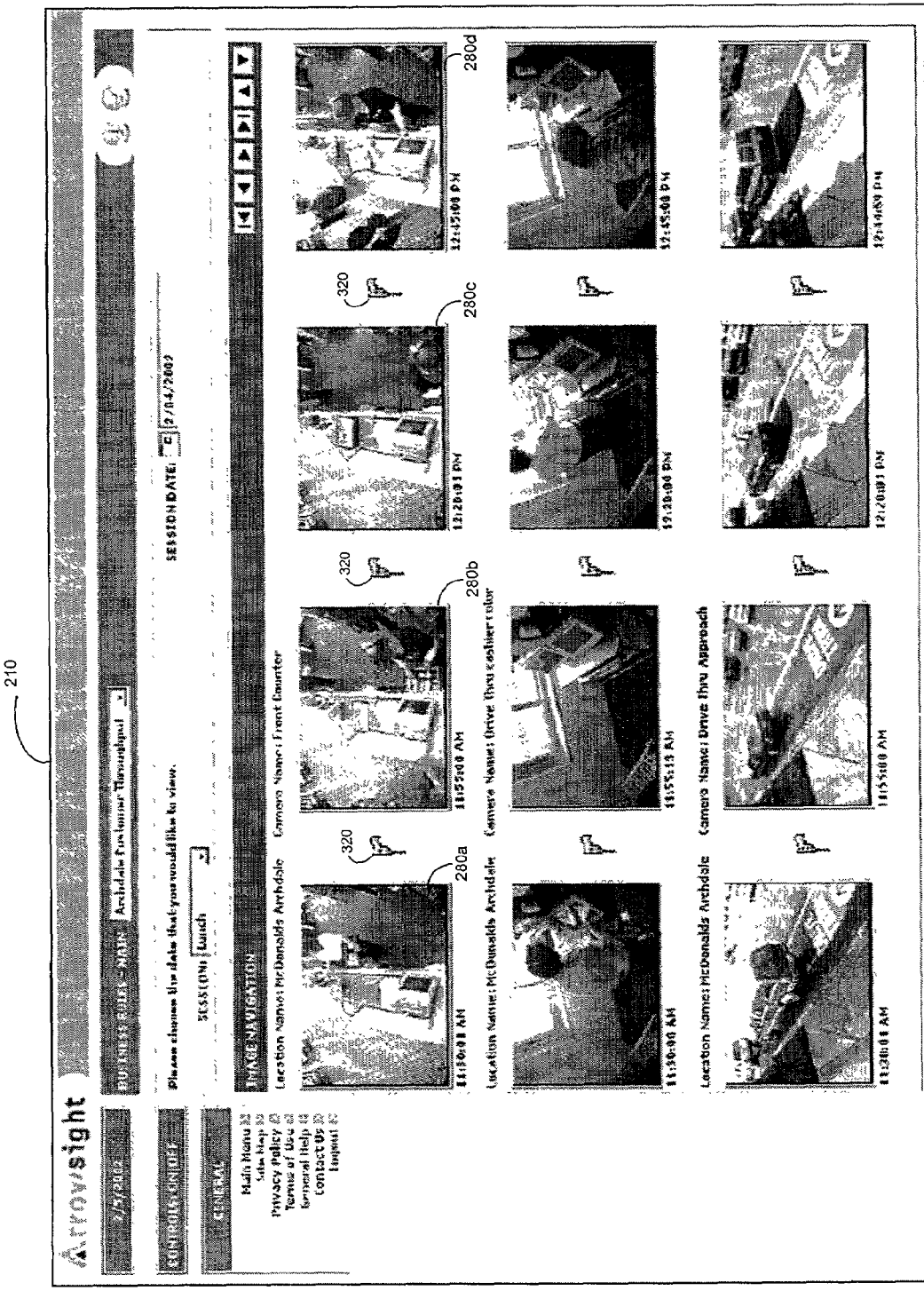
FIGS. 6A-6C illustrate the drilldown feature according to one embodiment of the invention.
Figure 6B:
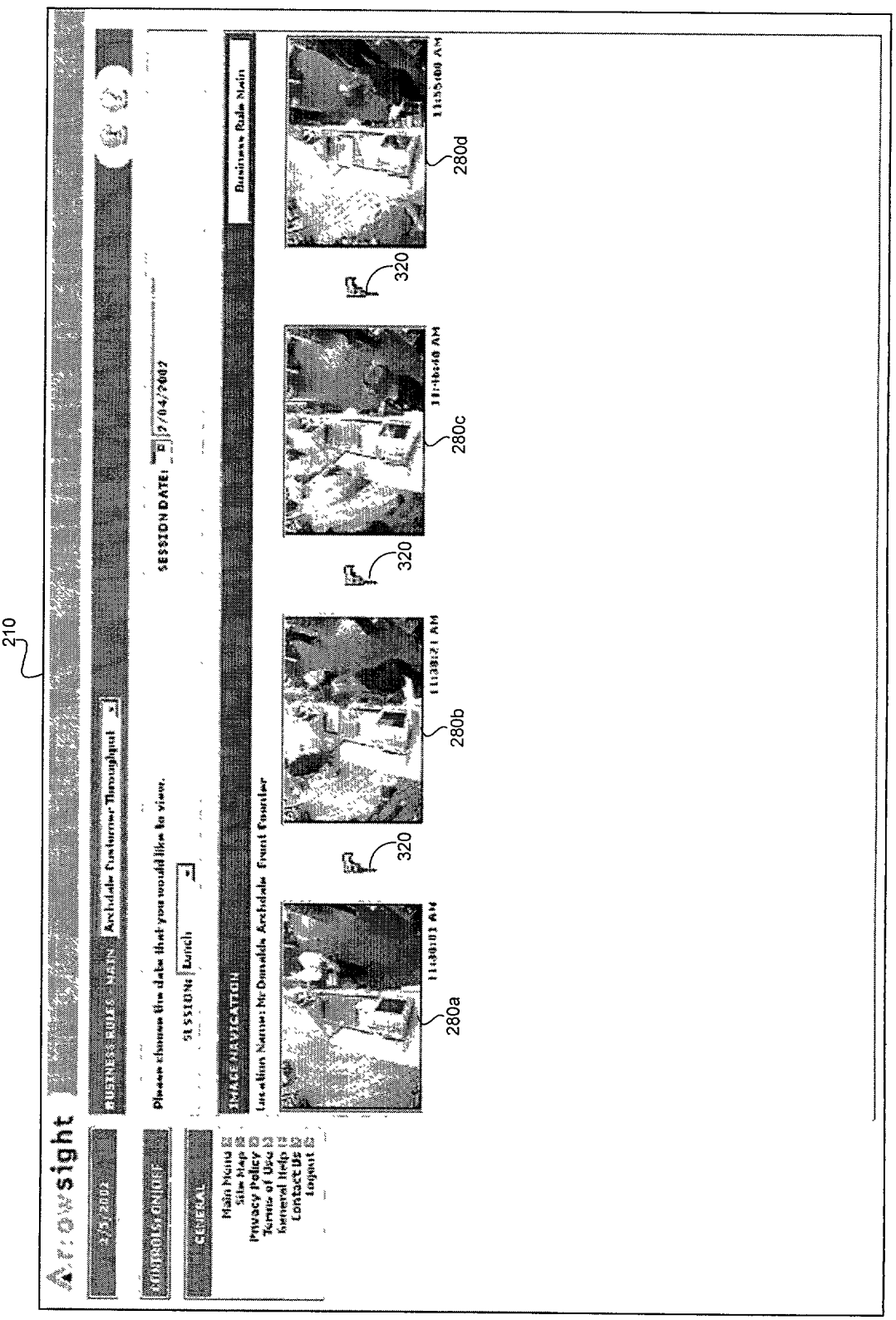
Figure 6C:
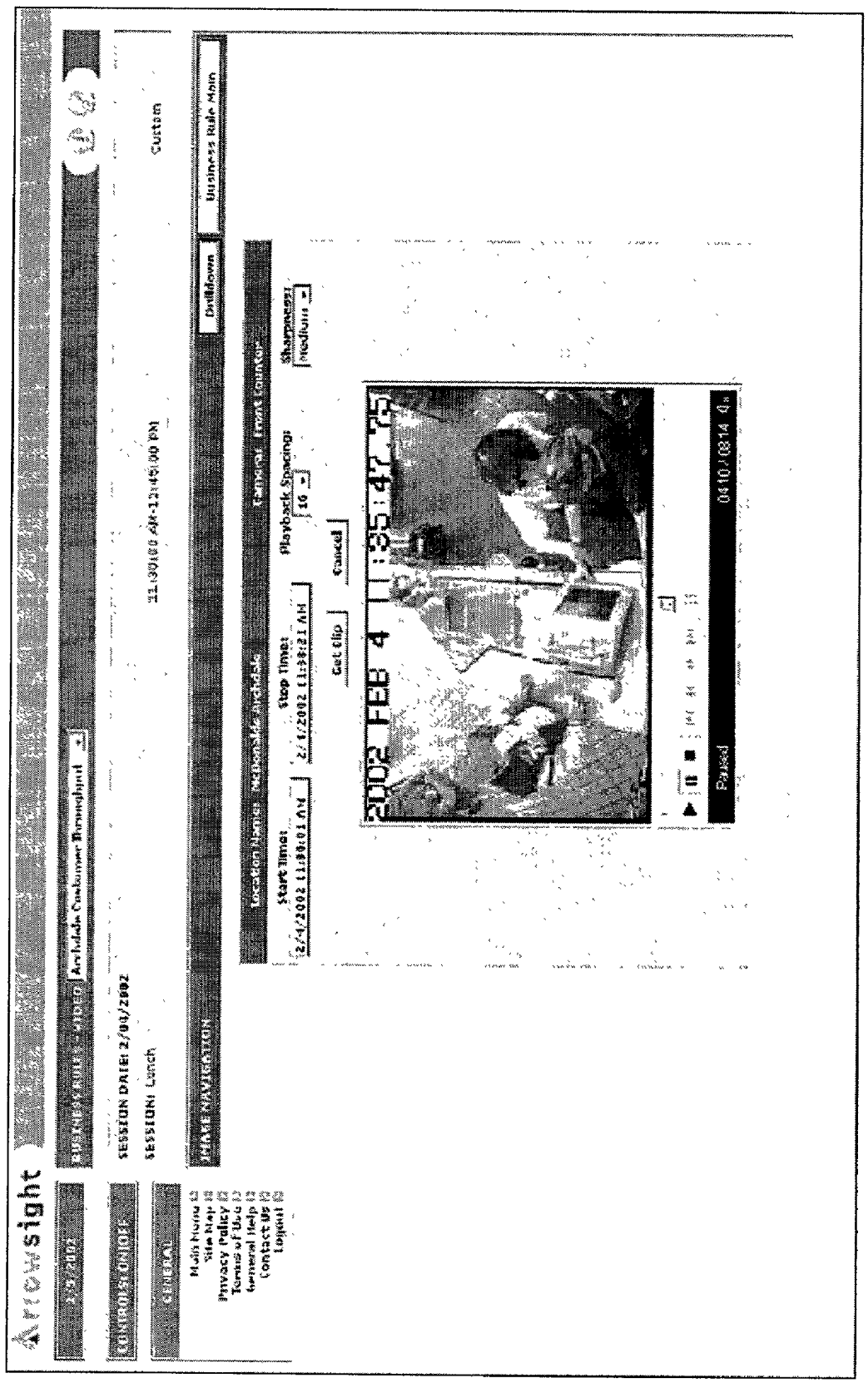

In the single camera view, multiple still images 280a-d can be displayed for a single camera 290a as shown in FIG. 5D. The dot links 320 are provided to locate snapshots recorded at time intervals between the adjacent still images.

The system 100 may also provide a video clip view as shown in FIG. 5E. Upon clicking on a still image 280, the video clip of the still image 280 may be played on the business rules screen 210. The format for the header 240 of Frame 1, shown in FIG. 5E may be configured similar to the screens shown in FIGS. 5A-5D, with the exception of the addition of a GET CLIP button 360. The GET CLIP button 360 is designed to initiate the first playback and for reinitiating playback of the video clip.

The navigation bar 270 of Frame 2 shown in FIG. 5E contains a spacing dropdown menu 370 for specifying the spacing between the frames that should be written into a video clip.

In the main section 300 of Frame 3 of FIG. 5E, the business rules screen 210 may display a clip 230 having a predetermined start time and end time as selected by the user.

The footer 330 of Frame 4 in FIG. 5E includes, for example, three editable fields for the start time using a start time button 375, the end time using an end time button 380 and the sharpness using a sharpness button 385. The start time 375 and the end time 380 of the still image 280 may have been selected by the user in a previous screen, and may be edited by the user using the features of the business rules screen 210 shown in FIG. 5E.

The system 100 may be configured so that only selected users are permitted to access the setup for the business rules 205. In addition to being able to create customized rules, the selected user may also have the ability to view, edit and delete existing pre-defined or custom business rules.

Prior to establishing the business rules as shown in FIGS. 7A-7E, the system 100 prompts the user to view a checklist of actions that may be required to develop a business rule. The system also provides access to a pop-up help screen that guides the user through the process of developing the business rules. In order to create a new business rule according to one embodiment of the invention, the selected user selects a setup functionality in the following manner:

Initially, the user either names and saves the business rule, or selects a predefined business rule.

After selecting a predefined rule or saving a new rule, the user selects the cameras that are relevant to record events for the selected business rule.

The user may establish the business rule recording frequency for each camera. For example, the user may instruct the camera to record the business rule event occurring on one or more days of the week for each camera.

Once the viewing frequency for all cameras has been setup, the user may specify the number of sessions per camera. In order to do so, the user specifies the number of viewing sessions per day per camera, by indicating the start and end times for each session. The record interval for each camera 140 may include a start time specifier and an end time specifier. The time specifier may consist of a day, an hour, and a minute input format for each recording session to begin and end. Each business rule can require the use of multiple cameras, and each camera can contain a unique number of sessions, with each session being recorded for a different length of time. Thus, all these variables may be independent of each other.

The system 100 also enables the user to instruct multiple cameras 140 to record simultaneously with different frame rates for each camera. Thus, the user is able to construct a capture schedule that includes all the desired specified frame rates for the cameras 140.

Within each session the user may wish to view a distinct number of stills from each session, thus the user is provided with the option of setting the time interval per session. At least two methods may be provided to enable the user to specify the number of desired stills to be retrieved for viewing during the session being customized. For instance, the first method may be a still/session method. In the still/session method, the user specifies the number of stills per session, and the system 100 calculates the time interval between each still (e.g., if the user specifies 10 still images from a two hour session, the system 100 then displays a still every 12th minute). The second method of setting the time interval per session is a stills/hour method, which allows the user to specify the desired number of stills per hour. The system 100 then calculates the time interval between each still image (e.g., if the user selected 10 stills per hour, the system 100 displays a still image every 6th minute from the session, regardless of the length of the session, such that for a three hour session 30 still images are retrieved and displayed).

The display format may be set, for example, in a single camera business rule format or a multiple camera business rule format.

The user may select the desired sharpness for viewing the still images. Selecting the desired sharpness may be accomplished using a drop down menu which includes, for example, the following choices: LOW (default), MEDIUM or HIGH. Varying the desired sharpness of the still images may directly affect the system's bandwidth. Namely, a still image selected to have a lower resolution will have a faster download time.

The system 100 may also be configured to include security and privacy features so that both selected users and sub users can access the user validation feature. Namely, the sub users may be permitted to view only the cameras for which they have access. The invention may be designed so that only the cameras that each user is authorized to have access to will show up when the user activates the drop down menu during a camera selection.

When each user logs in, the user receives a listing of all of the cameras that he or she is authorized to view. These cameras may reside at different physical locations and/or may be connected to one or more physically distinct video server/recorder devices, which may use different video compression formats.

According to one embodiment of the invention, the configuration parameters of each video server/recorder may be stored both in a central database, locally on the DVR 110. One advantage of this configuration is that status and diagnostic information from each DVR can be periodically uploaded (e.g., every 5 minutes) to the central database. This information can include the status of the video signal (whether the video signal is present or not present) from each video input, of still images, and can include information regarding cameras that are either too bright or too dark or out of focus. This feature of this embodiment enables technical support personnel or central database processing routines to proactively monitor, detect and report system problems and generate status reports on the system's operation. Further information can be derived from the transmission characteristics of these status reports, such as the IP address of the video server, which may change if the server has a dynamic IP address. Additional information can also be derived from the failure to receive these status reports, which would indicate a server or network failure.

Figure 7A:
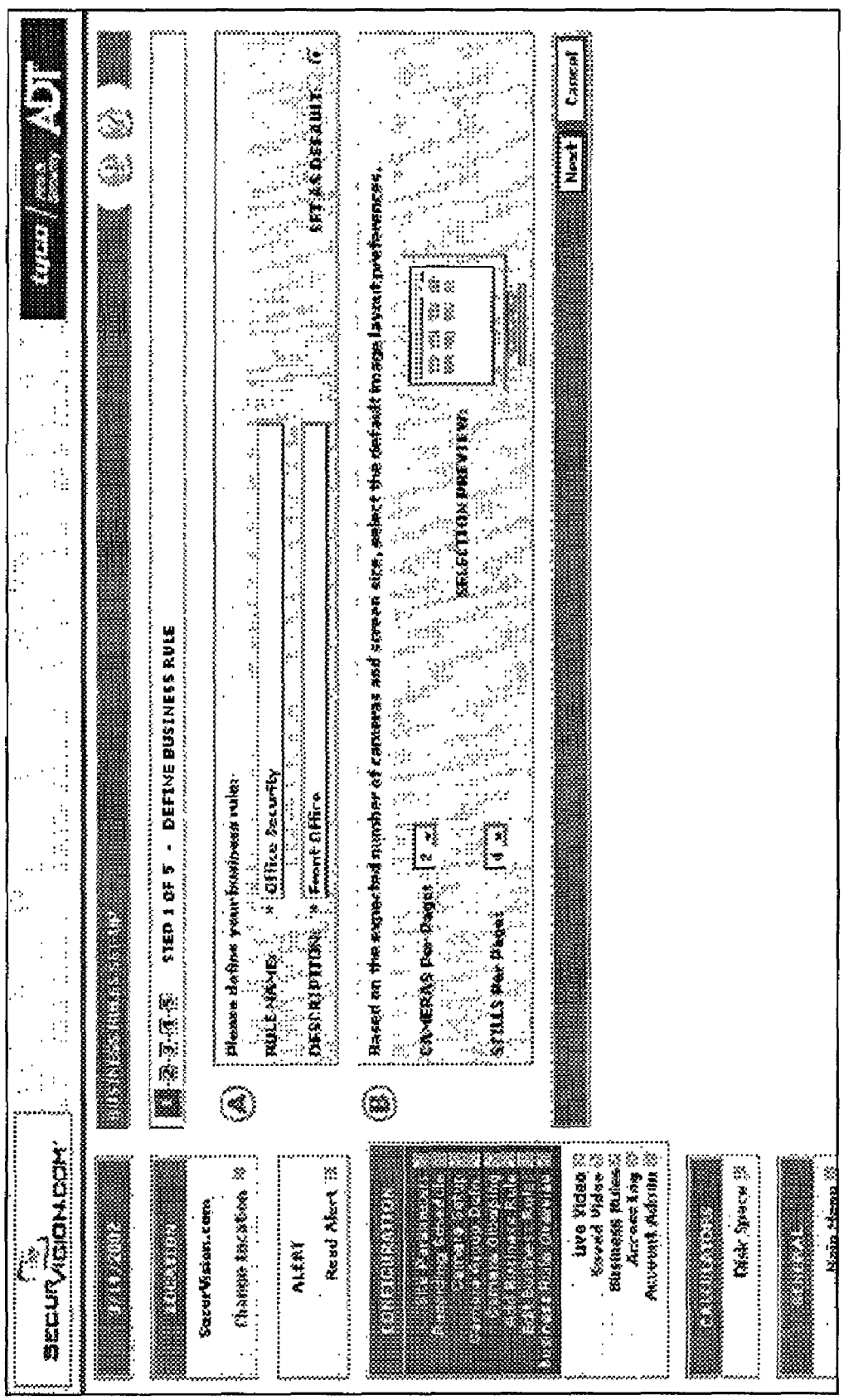

The method of establishing the business rules may be a five-step process as shown in FIGS. 7A-7E. The system provides access to a pop-up help screen that guides the user through all five steps of the process of developing the business rules. In order to create a new business rule according to one embodiment of the invention, the user selects a set up functionality in the following manner: Initially, the user names the business rule (FIG. 7A). After naming the new rule, the user selects how the cameras will be displayed. For example, the user may want to display two cameras per page with four still images displayed per camera.

Figure 7B:
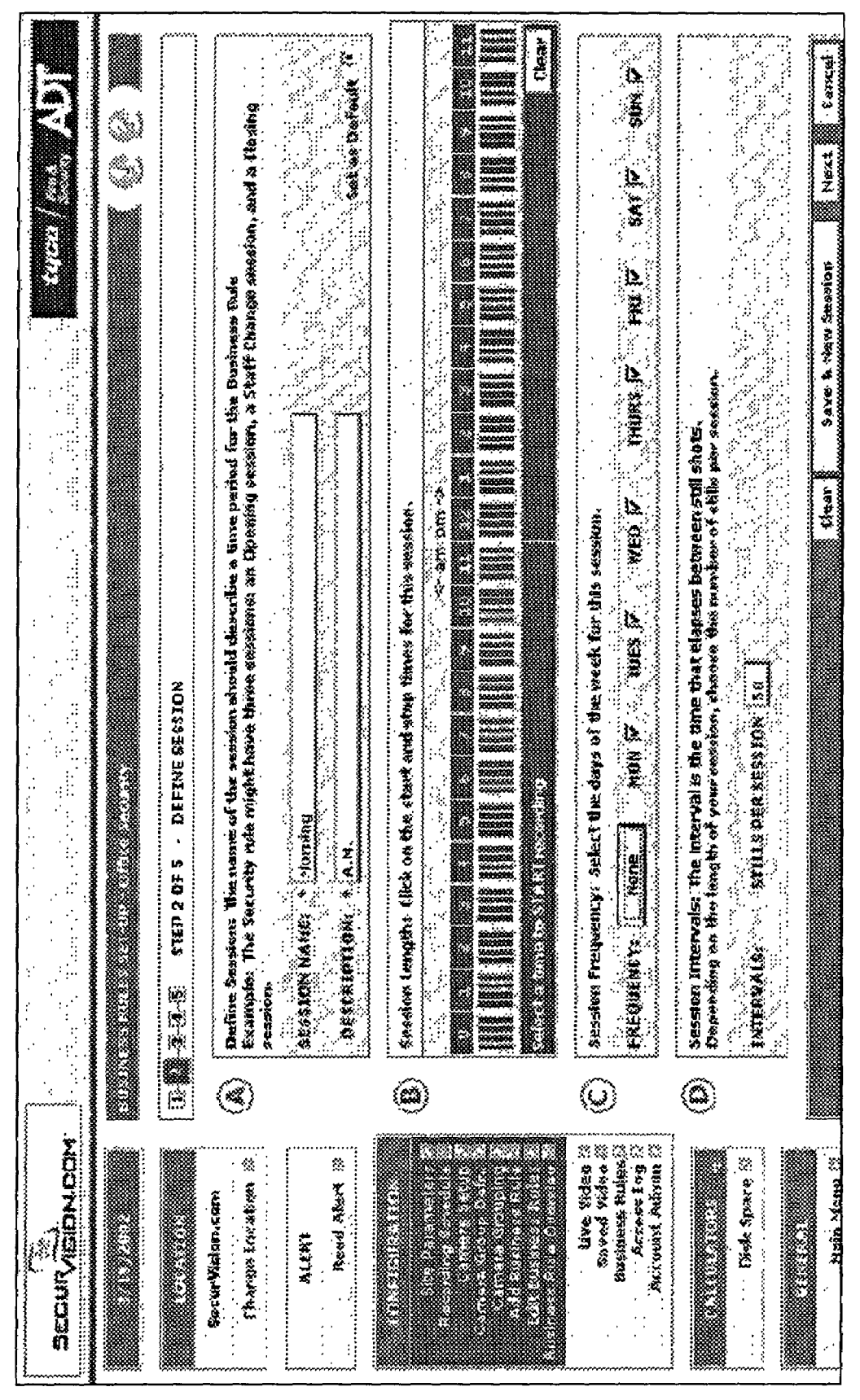

The user then defines the session(s) for the business rule (FIG. 7B). The user names the session and then defines the recording frequency for that session by clicking the start and end times on a visual representation of a twenty-four hour day divided into fifteen minute increments. The user then selects the recording frequency by selecting the days of the week that the current session will record. Thus, the user is provided with the option of setting the time interval per session. Within each session, the user may wish to view a distinct number of stills from each session. The preferred method of setting the time interval per session is a stills/hour method, which allows the user to specify the desired number of stills per hour. The system 100 then calculates the time interval between each still image (e.g., if the user selected ten stills per hour, the system 100 displays a still image every sixth minute from the session, regardless of the length of the session, such that for a three hour session thirty still images are retrieved and displayed).

The user then is prompted to either save the current session and move on to the next step. Alternatively, the user can save the current session and add another session repeating the steps described above to add an additional session.

Figure 7C:
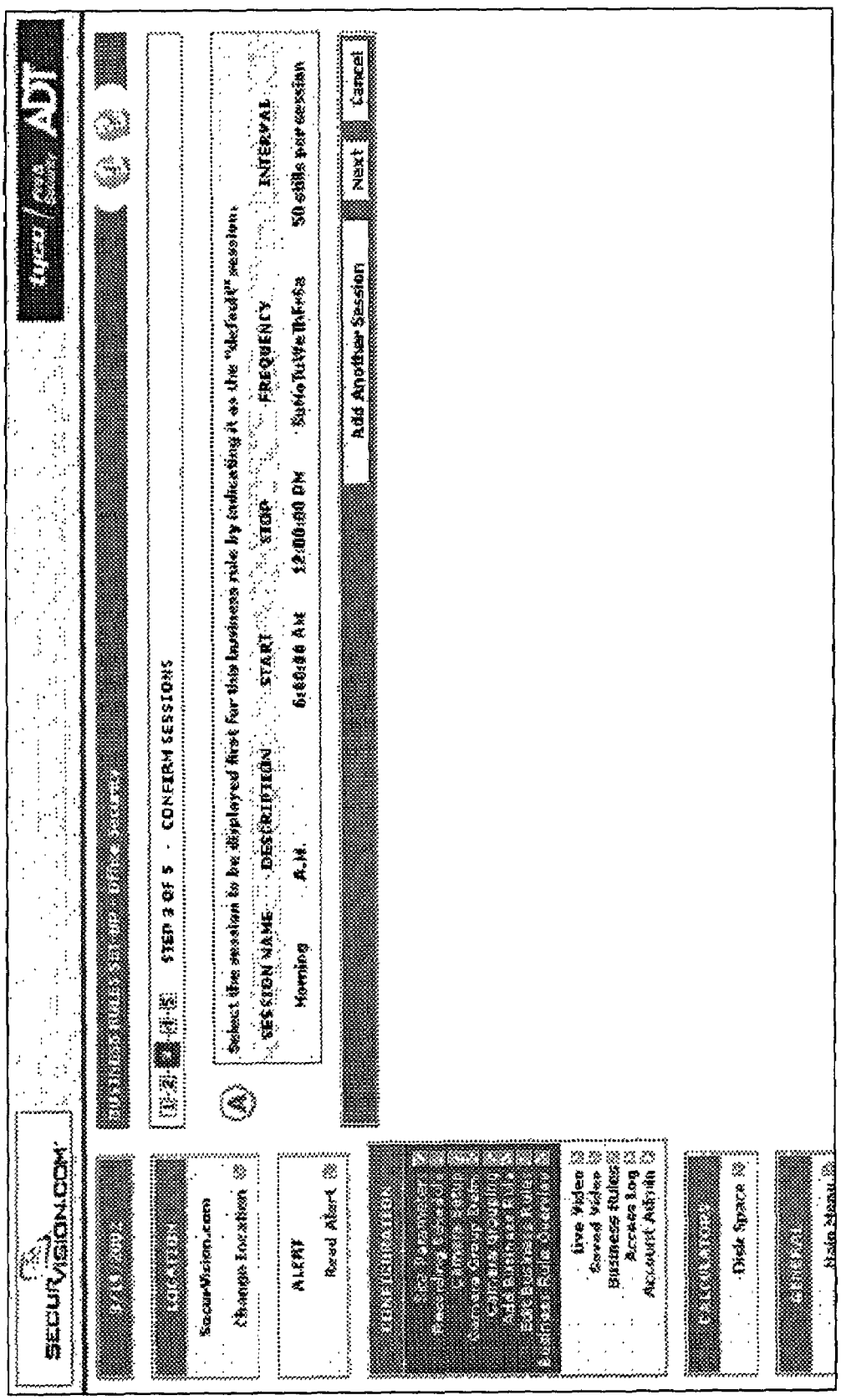
Figure 7D:
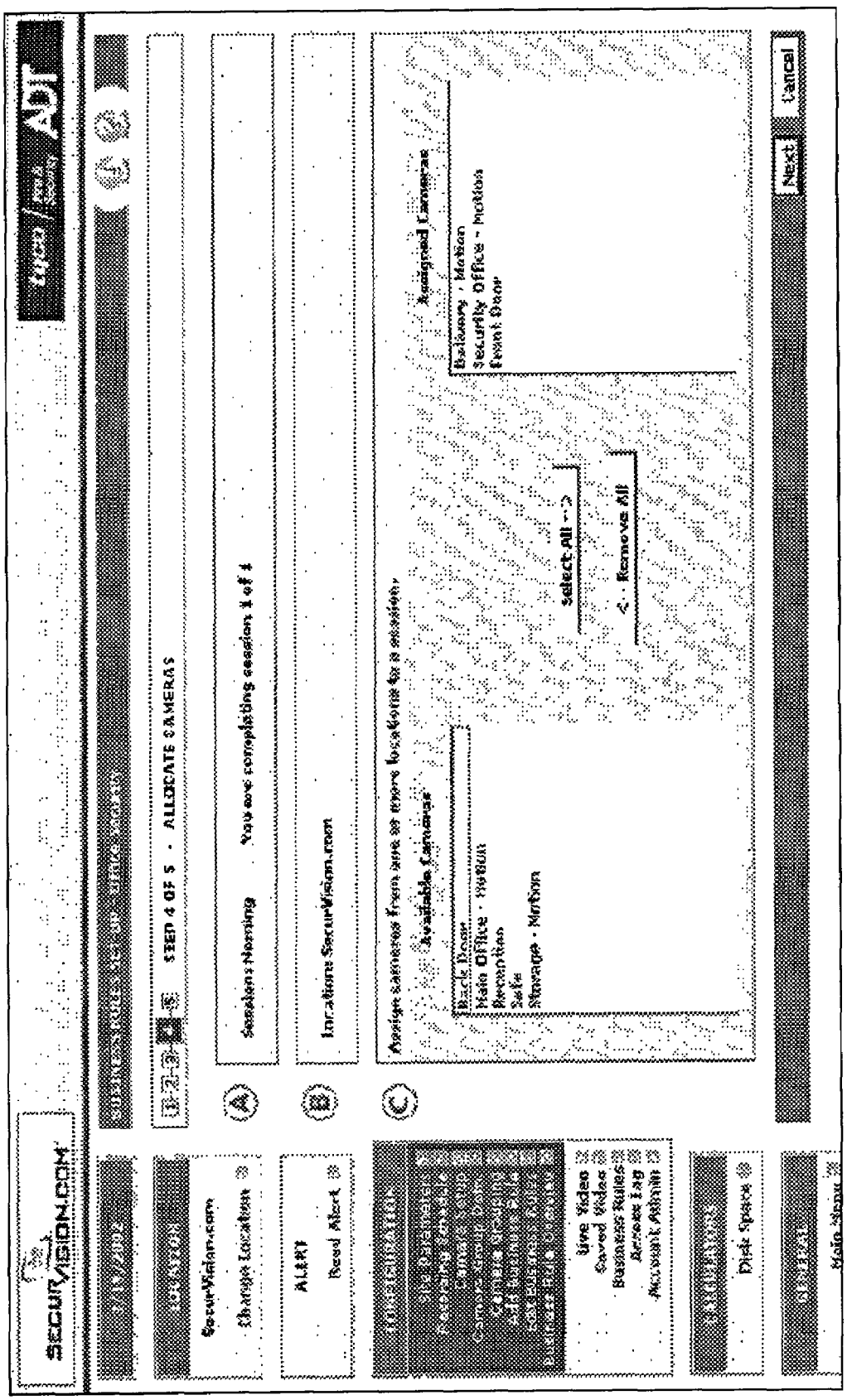

After all the desired sessions have been added, the user is then prompted to confirm that all sessions have been added on a confirmation page (FIG. 7C). The user then advances on to the next step which is to define the cameras for each session (FIG. 7D). The user can also define different cameras for each session. The user can define cameras from different locations in each session.

Figure 7E:
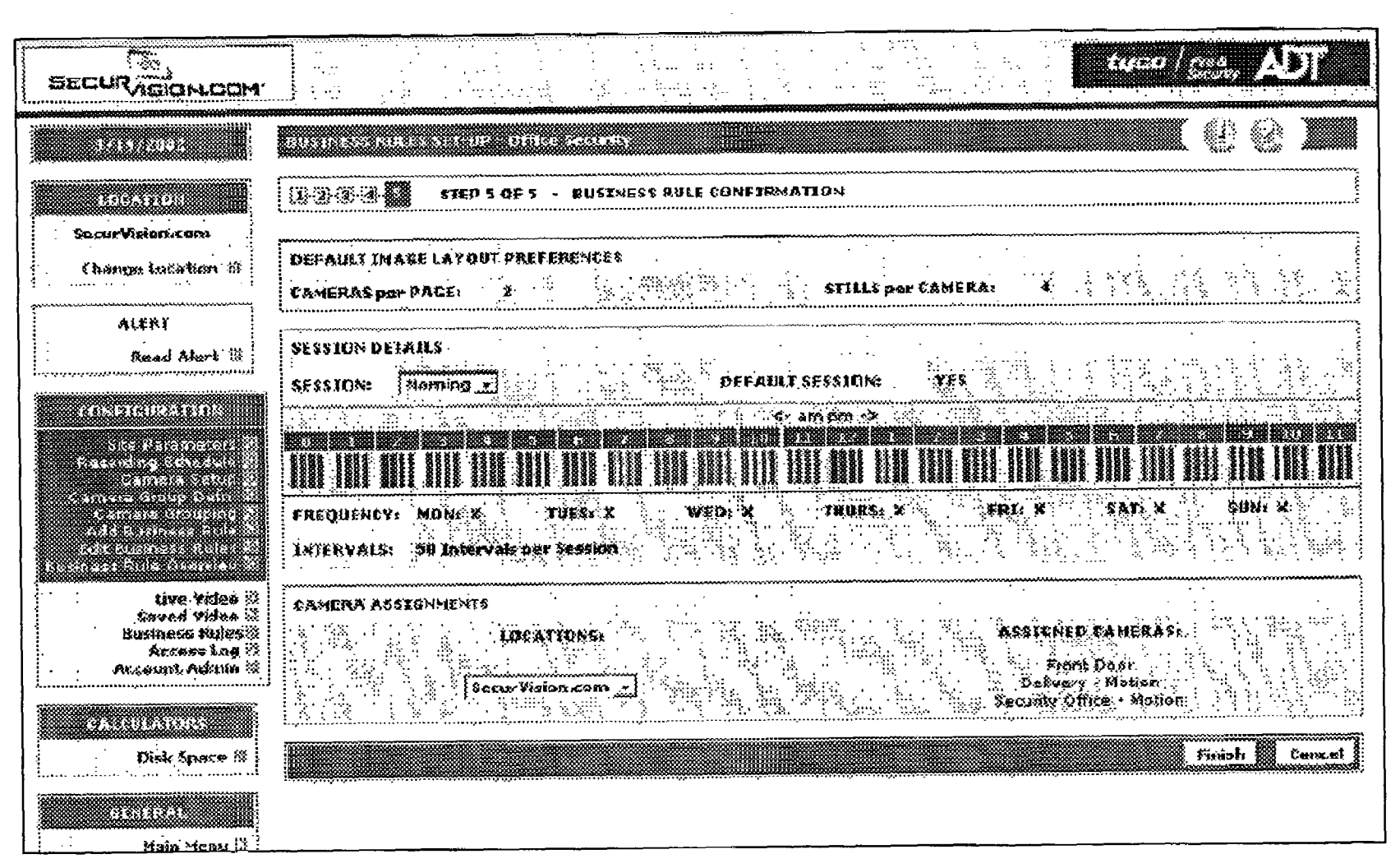

Once the user selects all of the cameras for all of the sessions, the user will then be prompted to advance onto the final step which is to confirm that the business rule with all of the sessions and cameras have been defined (FIG. 7E). The system 100 may also be configured to include security and privacy features so that selected users and sub users can both access the user validation feature. Namely, the sub users may be permitted to view only the cameras for which they have access. When each user logs in, the user receives a listing of all of business rules. When the user selects a business rule to view, they are presented with a page displaying stills from the cameras associated with this business rule. These cameras may reside at different physical locations and/or may be connected to one or more physically distinct video server/recorder devices, which may use different video compression formats.

Although the invention has been described based upon these preferred embodiments, it would be apparent to those skilled in the art that certain modifications, variations, and alternative constructions would be apparent, while remaining within the spirit and scope of the invention. In order to determine the metes and bounds of the invention, therefore, reference should be made to the appended claims.

We claim:

1. A system for allowing a user to select a video sequence from stored video data from multiple cameras, said stored video being time-stamped, the system comprising:
  a server component configured to receive a request specifying a time range, a desired spacing, and at least one camera from said multiple cameras, to dynamically process the stored video data to identify a subset of frames recorded from said at least one camera and having time-stamps that span the specified time range at the specified spacing, to generate one handle for each frame, that can be used to retrieve said each frame, and to send a reply response containing the generated handles,
  wherein the system is configured to cache video data of said subset of frames in a data cache, and
  wherein the system is configured to perform spatial or temporal reconstruction if signals of the subset of frames are sampled with different sampling rates and if a portion of the data for the selectable image sequence was previously stored in the data cache.

2. A system for allowing a user to select a video sequence from stored video data from multiple cameras, said stored video being time-stamped, the system comprising;
  a server component configured to receive a request specifying a time range, a desired spacing, and at least one camera from said multiple cameras, to dynamically process the stored video data to identify a subset of frames recorded from said at least one camera and having time-stamps that span the specified time range at the specified spacing, to generate one handle for each frame, that can be used to retrieve said each frame, and to send a reply response containing the generated handles, wherein the system is configured to cache video data of said subset of frames in a data cache, and wherein the system is configured to provide retrieval of a portion of the data for the subset of frames from the data cache if there are multiple requests for sets of images having overlapping time periods and if a portion of the data for one subset of frames requested was previously stored in the data cache.

3. A system for allowing a user to select a video sequence from stored video data from multiple cameras, said stored video being time-stamped, the system comprising:

a server component means for receiving a request specifying a time range, a desired spacing, and at least one camera from said multiple cameras, for dynamically processing the stored video data to identify a subset of frames recorded from said at least one camera and having time-stamps that span the specified time range at the specified spacing, for generating one handle for each frame, that can be used to retrieve said each frame, and for sending a reply response containing the generated handles, wherein the system is configured to cache video data of said subset of frames in a data cache, and wherein the system is configured to perform spatial or temporal reconstruction if signals of the subset of frames are sampled with different sampling rates and if a portion of the data for the selectable image sequence was previously stored in the data cache.

4. A system for allowing a user to select a video sequence from stored video data from multiple cameras, said stored video being time-stamped, the system comprising:

a server component means for receiving a request specifying a time range, a desired spacing, and at least one camera from said multiple cameras, for dynamically processing the stored video data to identify a subset of frames recorded from said at least one camera and having time-stamps that span the specified time range at the specified spacing, for generating one handle for each frame, that can be used to retrieve said each frame, and for sending a reply response containing the generated handles, wherein the system is configured to cache video data of said subset of frames in a data cache, and wherein the system is configured to provide retrieval of a portion of the data for the subset of frames from the data cache if there are multiple requests for sets of images having overlapping time periods and if a portion of the data for one subset of frames requested was previously stored in the data cache.

* * * * *